US007759439B2

(12) United States Patent
Rhodes et al.

(10) Patent No.: US 7,759,439 B2
(45) Date of Patent: Jul. 20, 2010

(54) USE OF A COMBINATION CHAIN TRANSFER AND ACTIVATING AGENT TO CONTROL MOLECULAR WEIGHT AND OPTICAL DENSITY OF PD CATALYZED NORBORNENE POLYMERS

(75) Inventors: Larry F. Rhodes, Silver Lake, OH (US); Steven Smith, Broadview Heights, OH (US); Pramod Kandanarachchi, Brecksville, OH (US); Chun Chang, Stow, OH (US); Patrick Bradley, Kent, OH (US)

(73) Assignee: Promerus LLC, Brecksville, OH (US)

( * ) Notice: Subject to any disclaimer, the term of this patent is extended or adjusted under 35 U.S.C. 154(b) by 0 days.

(21) Appl. No.: 12/056,481

(22) Filed: Mar. 27, 2008

(65) Prior Publication Data

US 2008/0242810 A1     Oct. 2, 2008

Related U.S. Application Data

(60) Provisional application No. 60/921,066, filed on Mar. 30, 2007, provisional application No. 60/993,866, filed on Sep. 14, 2007.

(51) Int. Cl.
*C08F 32/04* (2006.01)
(52) U.S. Cl. ............... 526/213; 430/281.1; 526/135; 526/145; 526/147; 526/171; 526/172; 526/183; 526/192; 526/242; 526/280; 526/281; 526/291; 526/292.1; 526/292.3; 526/294; 526/308; 526/319; 556/23
(58) Field of Classification Search ............. 430/281.1; 526/242, 247, 213, 280, 281, 291, 292.9, 526/294, 332, 903; 556/23
See application file for complete search history.

(56) References Cited

U.S. PATENT DOCUMENTS

| 5,677,405 | A | 10/1997 | Goodall et al. |
| 5,705,503 | A * | 1/1998 | Goodall et al. ............... 526/281 |
| 6,455,650 | B1 * | 9/2002 | Lipian et al. ................ 526/171 |
| 2007/0066775 | A1 * | 3/2007 | Rhodes et al. ............... 526/171 |

FOREIGN PATENT DOCUMENTS

| EP | 0589527 A1 | 3/1994 |
| EP | 1712572 A1 | 10/2006 |
| WO | 2004076495 A2 | 9/2004 |

OTHER PUBLICATIONS

Arcadi et al., "Palladium-catalyzed preparation of exo-aryl derivates of the norbornane skeleton", J. Organometallic Chem. 1989, 368, 249-256.*

(Continued)

*Primary Examiner*—Vasu Jagannathan
*Assistant Examiner*—Richard A Huhn
(74) *Attorney, Agent, or Firm*—The Webb Law Firm

(57) ABSTRACT

A method of controlling the molecular weight of poly(cyclic) olefin (norbornene-type) polymers and activating the polymerization thereof with a single material is provided. Such method include adding a chain transfer/activating agent to a mixture of monomer(s), catalyst, solvent and an optional cocatalyst and polymerizing the mixture to form a polymer. It is shown that the amount of chain transfer/activating agent in the mixture can serve to control the molecular weight of the resulting polymer, its percent conversion or both, and in some embodiments the optical density of the resulting polymer.

11 Claims, 3 Drawing Sheets

OTHER PUBLICATIONS

G.G. Barclay et al., "The 'Living' Free Radical Synthesis of Poly(4-hydroxystyrene): Physical Properties and Dissolution Behavior", Macromolecules 1998, pp. 1024-1031, vol. 31, No. 4.

R.G. Guy et al., "Olefin, Acetylene, and P.I.-Allylic Complexes of Transition Metals", Imperial Chemical Industries Limited, 1962, pp. 77-131, The Frythe, Welwyn, Herts., England.

M.L.H. Green et al., "Allyl Metal Complexes", Advances in Organometallic Chemistry, 1964, pp. 325-363, vol. 2, Academic Press.

W.T. Dent et al., "Some Observations on the Preparation of P.I.-Allylic Palladium Chloride Complexes", Journal of The Chemical Society, 1964, pp. 1584-1588, London, England.

H.C. Volger, "Synthesis of B-Alkyl and B-Aryl P.I.-Allylic Palladium Halide Complexes and Its Mechanistic Aspects", Reueil, 1968, pp. 225-239.c.

Soichi Owa et al., "Immersion Lithography: Out of the Lab and Into the Fab", Future FAB International, Issue 19, Jun. 28, 2005.

Larry F. Rhodes et al., "Development of Optically Transparent Cyclic Olefin Photoresist Binder Resins", Advances in Resist Technology and Processing XXII, 2005, pp. 149-161, vol. 5753, Bellingham, Washington, U.S.A.

Chun Chang et al., "The Effect of End Group Modification on the Transparency of Vinyl Addition Norbornene Polymers at 193 nma", Macromol. Chem. Phys. 2005, 206, 1988-2000.

Masato Oshina et al., "Synthesis and Properties of ($\pi$-Allyl)palladium Formates as Intermediates in Palladium-Catalyzed Reductive Cleavage of Allyllc Acetates and Carbonates with Formic Acid", Organometallics 1991, 10, 1221-1223.

Vladimir V. Grushin et al., "The First Isolable Organopalladium Formato Complexes: Synthesis. Characterization, and X-ray Structure. Facile and Convenient Thermal Generation of Coordinatively Unsaturated Palladium(0) Species", Organometallics 1995, 14, 3259-3263.

Natesan Thirupathi et al., "Synthesis and Reactivity of Cationic Palladium Phosphine Carboxylate Complexes", Organometallics 2005, 24, 4099-4102.

M. Switkes et al., "Bubbles in immersion lithography", J. Vac. Sci. Technol., B23(6), Nov./Dec. 2005, pp. 2409-2412.

Ayusman Sen et al., "Catalytic Polymerization of Acetylenes and Olefins by Tetrakis(acetonitrile)palladium(II) Bis(tetrafluoroborate)", Organometallics 1982, 1, 415-417.

* cited by examiner

Plot B

US 7,759,439 B2

USE OF A COMBINATION CHAIN TRANSFER AND ACTIVATING AGENT TO CONTROL MOLECULAR WEIGHT AND OPTICAL DENSITY OF PD CATALYZED NORBORNENE POLYMERS

CROSS-REFERENCE TO RELATED APPLICATIONS

This application claims the benefit of priority from U.S. Provisional Patent Ser. No. 60/921,066, filed Mar. 30, 2007, and U.S. Provisional Patent Ser. No. 60/993,866, filed Sep. 14, 2007, both of which are incorporated herein by reference.

TECHNICAL FIELD

The present invention relates generally to poly(cyclic)olefin polymers and more particularly to, norbornene-type polymers prepared with a chain transfer/activating agent for controlling molecular weight providing appropriately low optical densities and uses of such polymers.

BACKGROUND

Poly(cyclic)olefin polymers, such as those including norbornene-type repeating unit structures, have shown promise for use in photoresist compositions suitable for exposure at wavelengths such as 193 nm and 157 nm. For example, positive acting (positive tone) photoresists encompassing norbornene-type polymers have shown high dissolution rates after image-wise exposure and post-exposure thermal treatment, as well as superior resistance to dry etch and other typical semiconductor processing steps and acceptably low optical densities at the aforementioned wavelengths.

It is generally known that low molecular weight polymers, such as those used for photoresist compositions, tend to exhibit higher dissolution rates than their higher molecular weight analogs. Unfortunately, it is also known that such low molecular weight materials generally have a higher optical density (OD) than their higher molecular weight analogs. (See, Barclay et al. Macromolecules 1998, 31, 1024 for a discussion of these issues for poly(4-hydroxystyrene), the preferred material for 248 nm photoresists.) As a result, it is often necessary for a person designing such a polymer to target a higher molecular weight than desired for an optimal dissolution rate so that an acceptable OD can be obtained. It follows then that this compromise between optimal dissolution rate and optimal OD results in a photoresist composition that is not optimized for either characteristic.

While optically transparent dissolution rate modifiers (DRMs), a material that can be added to the photoresist composition to enhance the dissolution rate in appropriate areas of the resist and the use of an olefinic chain transfer agent (CTA) during the forming of a polymer can provide for acceptable dissolution rates, DRMs increase both the complexity of the resist composition and its cost, while olefinic CTAs have been found to provide acceptably low molecular weight polymers with higher than desirable ODs.

In U.S. Published Application 2004/0229157, non-olefinic chain transfer agents, such as hydrogen and some alkyl silanes, are described. While both types of CTAs can successfully control the molecular weight of norbornene-type polymers while not resulting in increased optical density, hydrogen's flammability and the need to remove silane residues from the polymer product where alkyl silanes are employed can at times be problematic.

Therefore, it would be desirable to find alternative methods of providing controllably low molecular weight polymers that do not encompass the above-mentioned deficiencies and/or problems while providing for norbornene-type polymers having both controllable molecular weight and appropriately low ODs. Further such alternate methods should not result in an unacceptable reduction in the conversion rate of the polymerization as compared to previously described CTAs. Still further, such alternate methods should not inappropriately increase the complexity of the process or the cost of the resulting polymer.

DETAILED DESCRIPTION

Figure 1:
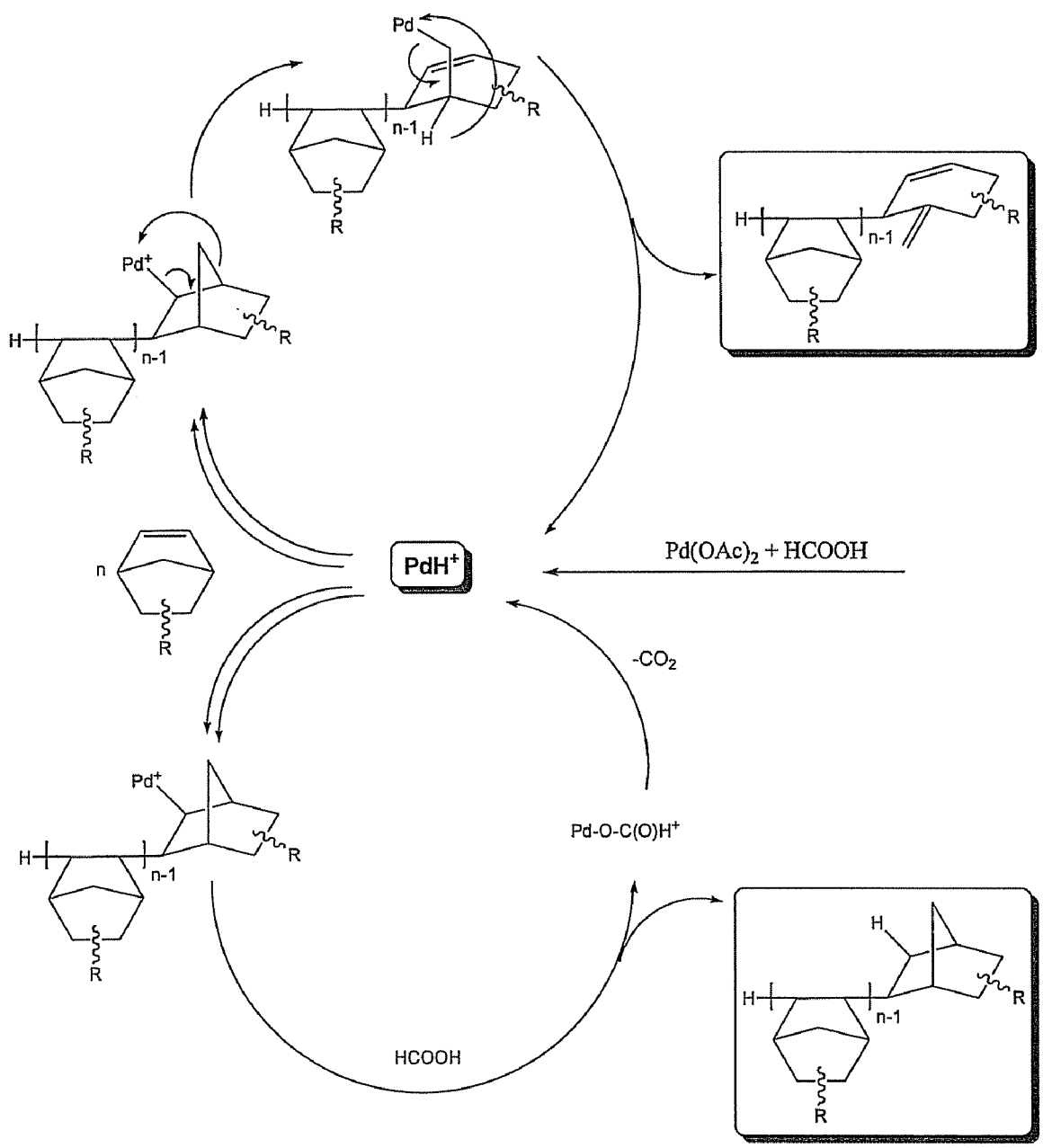
FIG. 1 shows a schematic of a theoretical polymerization mechanism of embodiments of the present invention.

Embodiments in accordance with the present invention are directed to providing methods of forming polycyclic olefin polymers, such as norbornene-type polymers, with both controllable molecular weight and desirably low optical density. Some embodiments in accordance with the present invention are further directed to providing such methods and polymers where essentially phosphorus-free polymerization catalysts are employed.

Unless otherwise indicated, all numbers, values and/or expressions referring to quantities of ingredients, reaction conditions, etc., used herein are to be understood as modified in all instances by the term "about" as absent the aforementioned indication, such numbers are approximations reflective of, among other things, the various uncertainties of measurement encountered in obtaining such values. Further, where a numerical range is disclosed herein such range is continuous, and includes every value between the minimum and maximum values of such range. Still further, where a range refers to integers, every integer between the minimum and maximum values of such range is included.

As used herein, the term "polymer composition" is meant to include a synthesized polymer, as well as residues from initiators, catalysts and other elements attendant to the synthesis of such polymer, where such residues are understood as not being covalently incorporated thereto. Such residues and other elements considered as part of the polymer composition are typically mixed or co-mingled with the polymer such that they tend to remain with the polymer when it is transferred between vessels or between solvent or dispersion media. A polymer composition can also include materials added after synthesis of the polymer to provide or modify specific properties to such composition.

As used herein, "hydrocarbyl" refers to a radical of a group that contains only carbon and hydrogen, non-limiting examples being alkyl, cycloalkyl, aryl, aralkyl, alkaryl, and alkenyl. The term "halohydrocarbyl" refers to a hydrocarbyl group where at least one hydrogen has been replaced by a halogen. The term perhalocarbyl refers to a hydrocarbyl group where all of the hydrogens have been replaced by a halogen.

As used herein, "alkyl" refers to a linear or branched acyclic or cyclic, saturated hydrocarbon group having a carbon chain length of, for example, from $C_1$ to $C_{25}$. Non-limiting examples of suitable alkyl groups include, but are not limited to, —$(CH_2)_3CH_3$, —$(CH_2)_4CH_3$, —$(CH_2)_5CH_3$, —$(CH_2)_{10}CH_3$, —$(CH_2)_{23}CH_3$ and cyclohexyl. The term "alkylol" refers to alkyl groups that include one or more hydroxyl groups.

As used herein the term "aryl" refers to aromatic groups that include, without limitation, groups such as phenyl, biphenyl, benzyl, xylyl, naphthalenyl, anthracenyl and the like, as well as heterocyclic aromatic groups that include, without limitation, pyridinyl, pyrrolyl, furanyl, thiophenyl and the like.

As used herein the terms "alkaryl" or "aralkyl" refer to a linear or branched acyclic alkyl group substituted with at least one aryl group, for example, phenyl, and having an alkyl carbon chain length of $C_2$ to $C_{25}$. The aryl group can be further substituted, if desired. Non-limiting examples of suitable substituent groups for the aryl group include, among others, hydroxyl groups, benzyl groups, carboxylic acid and carboxylic acid ester groups and aliphatic hydrocarbon groups. The alkyl group can be substituted with halogens.

As used herein, "alkenyl" refers to a linear or branched acyclic or cyclic hydrocarbon group having one or more double bonds and having an alkenyl carbon chain length of $C_2$ to $C_{25}$.

It will be understood that in the context of this disclosure, the term "low molecular weight" should be taken to mean a polymer with a molecular weight of less than about 20,000. It will also be understood that the term "low optical density" (low OD) should be taken to mean an optical density (OD) at 193 nm of less than about 0.25.

Additionally, it will be understood that in the context of this disclosure, the terms "non-phosphorous containing" or "phosphorous-free" when used to describe palladium catalysts, also include such catalysts that do not encompass arsenic (As), stilbene (Sb) or bismuth (Bi).

Methods in accordance with the present invention encompass combining one or more poly(cyclic)olefin monomers, a palladium catalyst, and a chain transfer/activating agent (CTAA) to form a mixture; and causing such mixture to polymerize thus forming a desired polymer. In some embodiments, such palladium catalyst is a non-phosphorus containing palladium catalyst. Advantageously, it has been found that the CTAAs employed in such embodiments can both control the molecular weight of the resultant polymer via a chain termination step and serve as a catalyst activating agent. As will be later shown, optimizing the reaction conditions (i.e., temperature, time, amount of CTAA added) can produce low molecular weight polymers with a generally high conversion rate as compared to an agent capable only of chain transfer and in some embodiments, advantageously provide polymers with a desirably low optical density (OD).

Without wishing to be bound to any particular theory, it is believed that a proposed reaction scheme is presented in FIG. 1. For ease of understanding and explanation, the description of FIG. 1 employs formic acid as an exemplary CTAA, palladium acetate as an exemplary catalyst and a generic substituted norbornene-type monomer. As shown, it is believed that the CTAA promotes the forming of an active palladium hydride cation PdH⁺ which can participate in one of the two major chain transfer events that are operative and competing. In the upper half of the mechanism, a unimolecular chain transfer event that first involves insertion of the norbornene double bond into the Pd—H bond of the cationic PdH. Once formed, this intermediate is believed to be capable of undergoing a rearrangement of the bicyclic system into a monocyclic system by β-carbon cleavage of the methylene bridge thus forming an endo-cyclic double bond where the Pd has migrated to the former methylene bridge carbon as seen in the second intermediate. While prior to this rearrangement the Pd was not beta (β) to readily accessible hydrogens, in the resulting intermediate, the Pd can freely rotate so as to align itself for H elimination from the β-tertiary carbon shown, to allow for the forming of an exo-cyclic double bond thus terminating the polymer chain with a diene end group, as depicted. The cationic Pd—H species eliminated should then be available for subsequent chain initiation. Thus in this upper mechanism β-C cleavage is a prelude to the β-H chain transfer reaction that serves to terminate a polymer chain during the polymerization.

In the lower half of the proposed mechanism, a bimolecular chain transfer event is shown. In this mechanism the intermediate described above is again believed to be formed by insertion of the norbornene double bond into the Pd—H bond of the PdH⁺, but rather than a rearrangement, a bimolecular reaction with the acidic hydrogen of the formic acid CTAA serves to eliminate the Pd as a Pd-formate and terminate the polymer chain with a hydrogen end group, as depicted. It is believed that this cation can advantageously eliminate $CO_2$ and re-form the cationic Pd—H species. Thus the formic acid serves to both initiate the chain transfer and reform the active Pd—H cation. It should be understood that is the degree to which each of the upper or lower chain transfer events occur that contributes to the combined molecular weight and optical density lowering of the polymers that result from the use of a CTAA. That is to say, if the upper mechanism in which diene end groups are created predominates, a majority of polymer chains having a diene termination will be created while if, by and through the addition of a CTAA such as formic acid, the lower mechanism predominates, a majority of polymer chains will be hydrogen terminated.

Thus CTAAs, in general, are believed to have the necessary properties to terminate the chain of a growing polymer as well as to enable an intermediate catalyst complex to generate an active palladium hydride for continued chain polymerization. Some embodiments of the present invention encompass CTAAs such as formic acid, however while only formic acid embodiments are exemplified hereinafter, it is believed that other such acids, for example, thio-formic acid and dithio-formic acid, among others, can also perform as CTAAs. Therefore it is not the intent of the inventors to limit the scope and spirit of the present invention to formic acid.

It has been found that the molecular weight of the resulting polymer is related, in part, to the concentration of the CTAA, since in most instances it is observed that as the CTAA concentration increases, the molecular weight of the resultant poly(norbornene) decreases. However, it is also observed that in some instances certain concentrations of CTAA produce polymers with unexpectedly high molecular weights. Without wishing to be bound by theory, and as shown in FIG. 1, it is believed that the since both the activation effect and terminating effect of such agent are created by the same agent such effects are necessarily related. Therefore, it may very well be that at certain concentration levels of the CTAA, one effect may predominate over the other. Thus, while the theoretical reaction schemes of FIG. 1 illustrates that the CTAA can be both an activating agent and a chain transfer agent, such scheme does not address any effects that variations in relative amount/concentration of the CTAA employed can cause. While this relationship will be discussed more fully below and illustrated by the Examples provided hereinafter, it should be understood, that for any polymerization reaction (the catalyst, CTAA, monomer(s), solvents, etc.) the relative amounts of the several materials provided to the reaction vessel as well as the reaction conditions (time, temperature, etc.) employed can influence the polymer obtained. That is to say, for any set of materials, varying these relative amounts and/or reaction conditions can readily be used to provide a desired polymer.

It should be further noted that in embodiments of the present invention where a phosphorous-containing catalyst complex is employed, chain termination to form the diene seems less favored than in embodiments that employ a phosphorous-free catalyst complex. While this difference between these types of catalysts is not fully understood, it is believed that where a phosphorous-free complex contains at least one moiety that is replaceable by one or more CTAA's, a polymerization employing such a complex will generally provide a polymer having a lower optical density as the CTAA concentration is increased.

Embodiments in accordance with the present invention are suitable for the preparation of polymers encompassing a wide range of norbornene-type repeating units. As defined herein, the terms "polycycloolefin", "poly(cyclic)olefin", and "norbornene-type" are used interchangeably and refer to addition polymerizable monomers (or the resulting repeating unit), that encompass at least one norbornene moiety such as shown below:

The simplest norbornene-type or poly(cyclic)olefin monomer encompassed by embodiments in accordance with the present invention is the bicyclic monomer, bicyclo[2.2.1]hept-2-ene, commonly referred to as norbornene. However, the term norbornene-type monomer or repeating unit is used herein to mean norbornene itself as well as any substituted norbornene(s), or substituted and unsubstituted higher cyclic derivatives thereof. Structural formula A, shown below, is representative of such norbornene monomers:

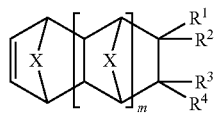

A where X is selected from —$CH_2$—, —$CH_2$—$CH_2$—, O, S, and —NH—; m is an integer from 0 to 5 and each occurrence of $R^1$, $R^2$, $R^3$ and $R^4$ independently represents hydrogen, a hydrocarbyl or other substituent.

When any of $R^1$ to $R^4$ is a hydrocarbyl group, such group can be a $C_1$ to $C_{30}$ alkyl, aryl, aralkyl, alkaryl, alkenyl, alkynyl, cycloalkyl, cycloalkenyl, alkylidenyl or alkylsilyl group. Representative alkyl groups include, but are not limited to, methyl, ethyl, propyl, isopropyl, butyl, isobutyl, sec-butyl, tert-butyl, pentyl, neopentyl, hexyl, heptyl, octyl, nonyl and decyl. Representative alkenyl groups include, but are not limited to, vinyl, allyl, butenyl and cyclohexenyl. Representative alkynyl groups include, but are not limited to, ethynyl, 1-propynyl, 2-propynyl, 1-butynyl and 2-butynyl. Representative cycloalkyl groups include, but are not limited to, cyclopentyl, cyclohexyl and cyclooctyl substituents. Representative aryl groups include, but are not limited to, phenyl, naphthyl and anthracenyl. Representative aralkyl groups include, but are not limited to, benzyl and phenethyl. Representative alkylidenyl groups include methylindenyl and ethylidenyl groups. In addition, it should be noted that the hydrocarbyl groups mentioned above can be substituted, that is to say one of the hydrogen atoms replaced, with linear and branched $C_1$-$C_{10}$ alkyl, haloalkyl and perhaloalkyl groups, aryl groups and cycloalkyl groups.

Any of $R^1$ to $R^4$ can also be a halohydrocarbyl group, where such group includes any of the hydrocarbyls mentioned above where at least one, but less than all, of the hydrogen atoms of the hydrocarbyl are replaced by a halogen (fluorine, chlorine, bromine or iodine). Additionally, any of $R^1$ to $R^4$ can be a perhalocarbyl, where such group includes any of the hydrocarbyls mentioned above where all of the hydrogen atoms of the hydrocarbyl are replaced by a halogen. Useful perfluorinated substituents include perfluorophenyl, perfluoromethyl, perfluoroethyl, perfluoropropyl, perfluorobutyl and perfluorohexyl.

When the pendant group(s) is an other substituent, any of $R^1$ to $R^4$ independently represent linear or branched carboxylic acid, carboxylic acid ester, carboxylic acid ether, ether, alcohol and carbonyl groups. Representative examples of "other" substituents are functional substituents that include, but not limited to, radical selected from —$(CR^\dagger_2)_n$—C(O)O$R^5$, —$(CR^\dagger_2)_n$—O—$R^5$, —$(CR^\dagger_2)_n$—C(O)—$R^5$, —$(CR^\dagger_2)_n$—Si—$R^5$, —$(CR^\dagger_2)_n$Si(O—$R^5$)$_3$, -A-O—[—(C($R^5$)$_2$—)$_n$—O—]$_n$—(C($R^5$)$_2$—)$_n$—OH and $R^5$—(Z), where 'n' independently represents an integer from 0 to 10, $R^\dagger$ can be hydrogen or halogen and each $R^5$ independently represents hydrogen, halogen, $C_1$ to $C_{30}$ alkyl, aryl, aralkyl, alkaryl, alkenyl, alkynyl, cycloalkyl, cycloalkenyl and alkylidenyl groups that can also contain one or more hetero atoms. Further, 'A' is a linking group selected from $C_1$ to $C_6$ linear, branched, or cyclic alkylene, and 'Z' is a functional group selected from hydroxyl, carboxylic acid, amine, thiol, isocyanate and epoxy. Representative hydrocarbyl groups set forth under the definition of $R^5$ are the same as those identified above under the definition of $R^1$ to $R^4$, above. Further, $R^5$ can represent a moiety selected from —C(CH$_3$)$_3$, —Si(CH$_3$)$_3$, —CH(R$^{37}$)OCH$_2$CH$_3$, —CH(R$^{37}$)OC(CH$_3$)$_3$ or the following cyclic groups:

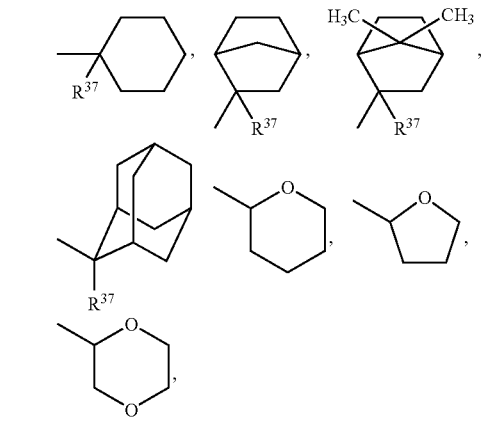

where $R^{37}$ represents hydrogen or a linear or branched ($C_1$-$C_5$)alkyl group. The alkyl groups include methyl, ethyl, propyl, i-propyl, butyl, i-butyl, t-butyl, pentyl, t-pentyl and neopentyl. In the above structures, the single bond line projecting from the cyclic groups indicates the position where the cyclic group is bonded to the acid substituent.

Thus, examples of $R^5$ include 1-methyl-1-cyclohexyl, isobornyl, 2-methyl-2-isobornyl, 2-methyl-2-adamantyl, tetrahydrofuranyl, tetrahydropyranoyl, 3-oxocyclohexanonyl, mevalonic lactonyl, 1-ethoxyethyl and 1-t-butoxy ethyl radicals, as well as the dicyclopropylmethyl (Dcpm), and dimethylcyclopropylmethyl (Dmcp) groups represented by the following structures:

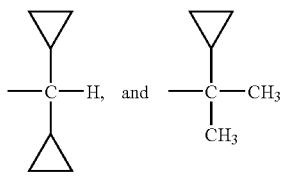

Further, in some embodiments in accordance with the present invention, monomers represented in Structural Formula A above, can have $R^1$ and $R^4$ taken together with the two ring carbon atoms to which they are attached represent a substituted or unsubstituted cycloaliphatic group containing 4 to 30 ring carbon atoms or a substituted or unsubstituted aryl group containing 6 to 18 ring carbon atoms or combinations thereof. The cycloaliphatic group can be monocyclic or polycyclic. When unsaturated the cyclic group can contain monounsaturation or multiunsaturation, with monounsaturated cyclic groups being found useful. When substituted, the rings contain monosubstitution or multisubstitution wherein the substituents are independently selected from hydrogen, linear and branched $C_1$-$C_5$ alkyl, linear and branched $C_1$-$C_5$ haloalkyl, linear and branched $C_1$-$C_5$ alkoxy, halogen, or combinations thereof. The radicals $R^1$ and $R^4$ can be taken together to form the divalent bridging group, —C(O)-G-(O)C—, which when taken together with the two ring carbon atoms to which they are attached form a pentacyclic ring, where G represents an oxygen atom or the group $N(R^{38})$, and $R^{38}$ is selected from hydrogen, halogen, linear and branched $C_1$-$C_{10}$ alkyl, and $C_6$-$C_{18}$ aryl. A representative structure is shown in below, where m is an integer from 0 to 5.

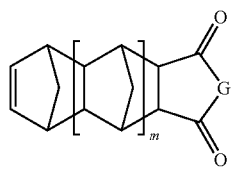

In some embodiments in accordance with Structural Formula A, the perhalohydrocarbyl groups can include perhalogenated phenyl and alkyl groups. In other embodiments, the perfluorinated substituents can include perfluorophenyl, perfluoromethyl, perfluoroethyl, perfluoropropyl, perfluorobutyl and perfluorohexyl. In addition to the halogen substituents, cycloalkyl, aryl and aralkyl groups of such embodiments can be further substituted with linear and branched $C_1$-$C_5$ alkyl and haloalkyl groups, aryl groups and cycloalkyl groups. Non-limiting examples of monomers in accordance with embodiments of the present invention include those shown below in Monomer Groups AA, BB, and CC.

In some other embodiments in accordance with Structural Formula A, the poly(cyclic)olefin monomer includes HFANB, 5-norbornene-2-methanol hydroxylethylether, t-butyl ester of norbornene 5-carboxylic acid, hydroxyethylester of 5-norbornene carboxylic acid, trimethylsilane ester of 5-norbornene carboxylic acid, 5-norbornene-2-methanol acetate, 5-norbornene-2-methanol, 5-norbornene-2-ethanol, 5-triethoxysilylnorbornene, 1-methylcyclopentyl ester of 5-norbornene carboxylic acid, tetrahydro-2-oxo-3-furanyl ester of 5-norbornene carboxylic acid and mixtures thereof.

In some other embodiments in accordance with Structural Formula A, at least one of $R^1$ to $R^4$ can be a $QNHSO_2R^8$ group or a $Q^{\ddagger}(CO)O$—$(CH_2)_n$—$R^8$ group, where Q and $Q^{\ddagger}$ are optional linear or branched alkyl spacer of 1 to 5 carbons, m is either 0 or an integer from 1 to 3 inclusive and $R^8$ is a perhalo group of 1 to about 10 carbon atoms.

In some embodiments in accordance Structural Formula A, at least one of $R^1$ to $R^4$ is one of groups A, B or C:

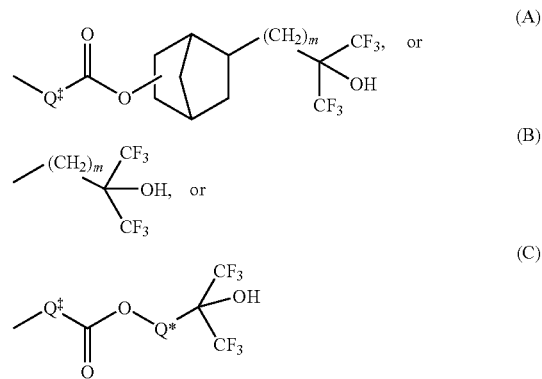

where m and $Q^{\ddagger}$ are as defined above and $Q^*$ is a linear or branched alkyl spacer of 1 to 5 carbons.

In some embodiments encompassing groups A or C, $Q^{\ddagger}$ is not present or is a linear alkyl spacer of 1 to 3 carbons and additionally for group C, $Q^*$ is a linear or branched spacer of 3 or 4. In other such embodiments Q: is not present or is 1 carbon atom. In other embodiments encompassing group B, m is either 1 or 2. In exemplary embodiments of the encompassing repeating units represented by Structural Formula A, X is —$CH_2$—, one of $R^1$ to $R^4$ is group B and the others are each hydrogen, n is 0 and m is 1

In yet other embodiments in accordance with Structural Formula A, at least one of $R^1$ to $R^4$ is one of groups D, E or F:

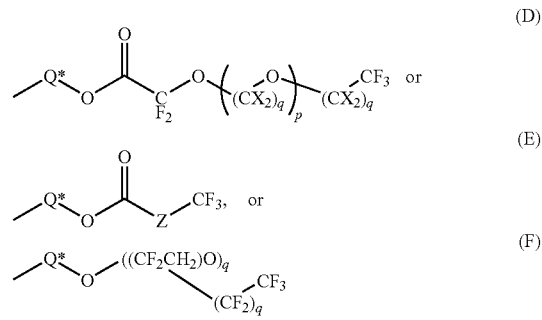

where each X is independently either F or H, each q is independently an integer from 1 to 3, p is an integer from 1 to 5, $Q^*$ is as defined above, and Z is a linear or branched halo or perhalo spacer of 2 to 10 carbons.

In some embodiments encompassing group D, Q* is one carbon, X is F, q is 2 or 3 and p is 2. In some embodiments encompassing group E, Q* is one carbon and Z is a branched fluorinated alkyl chain of up to 9 carbons units. In some embodiments encompassing group F, Q* is one carbon and q is 1 or 2.

In other embodiments in accordance with Structural Formula A, at least one of $R^1$ to $R^4$ is a group represented by the formula:

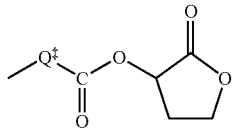

G where $Q\ddagger$ is an optional linear or branched alkyl spacer where if present is of 1 to 5 carbons. In some other embodiments the others of $R^1$ to $R^4$ are each hydrogen and Q: is not present or is a linear alkyl spacer of 1 to 3 carbons. In still other embodiments the others of $R^1$ to $R^4$ are each hydrogen and $Q^\ddagger$ is not present or is 1 carbon atom and in yet still other embodiments, the others of $R^1$ to $R^4$ are each hydrogen and $Q\ddagger$ is not present.

In other embodiments in accordance with Structural Formula A, at least one of $R^1$ to $R^4$ is a group represented by one of H, J or K shown below:

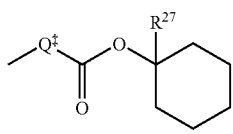

H

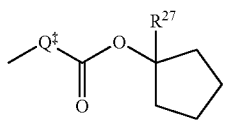

J

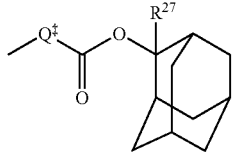

K

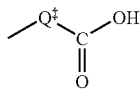

HJK(acid)

where $Q^\ddagger$ is as defined above and $R^{27}$ is a linear or branched alkyl group of 1 to about 5 carbon atoms. It should be noted that the HJK (acid) group represented above, is derived from one of the H, J or K groups.

The monomer composition can include any one or multiple variations of the poly(cyclic)olefin monomers of Structural Formula A. Other embodiments in accordance with the present invention encompass homopolymers and polymers of monomers in accordance with any of Structural Formula A. In other embodiments, the poly(cyclic)olefin monomers used to make the polymers of the present invention include one or more of those shown in FIG. 2 and in Structural Groups AA, BB and CC shown below.

Monomer Group AA

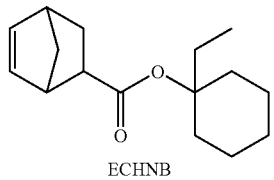

ECHNB

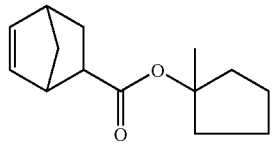

MCPNB

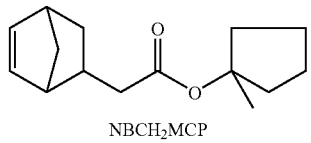

NBCH₂MCP

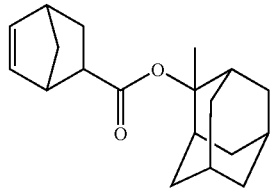

MADNB

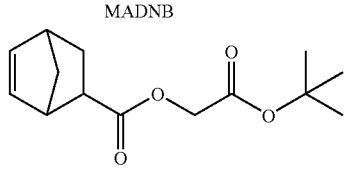

NBCOOBOCME

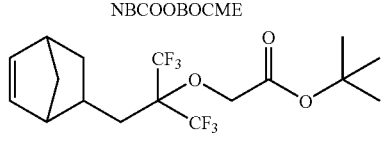

NBHFABOCME

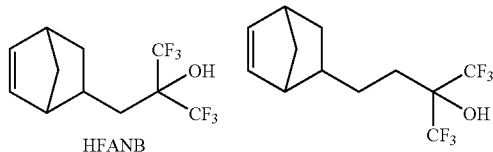

HFANB          HFACH₂NB

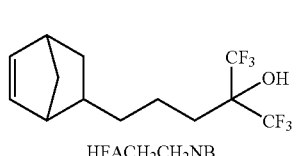

HFACH₂CH₂NB

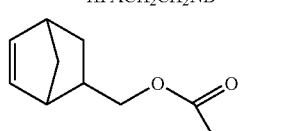

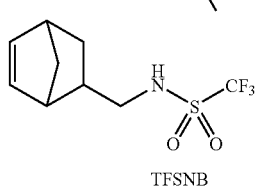

TFSNB

-continued
TFSCH₂NB
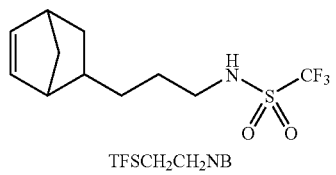
TFSCH₂CH₂NB
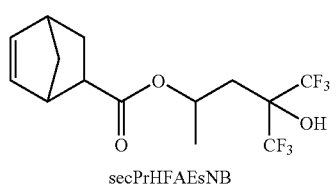
secPrHFAEsNB
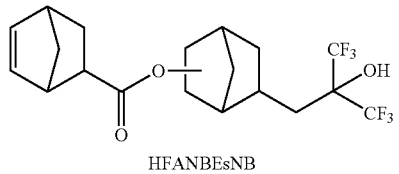
HFANBEsNB
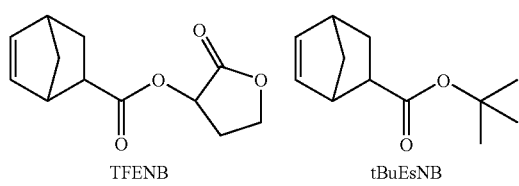
TFENB   tBuEsNB
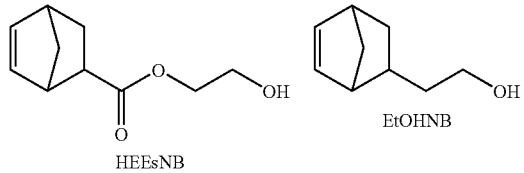
HEEsNB   EtOHNB
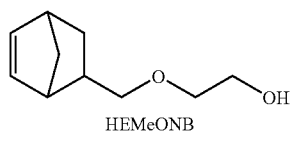
HEMeONB
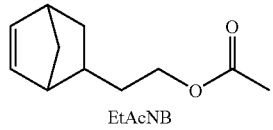
EtAcNB
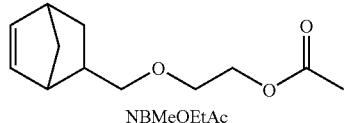
NBMeOEtAc
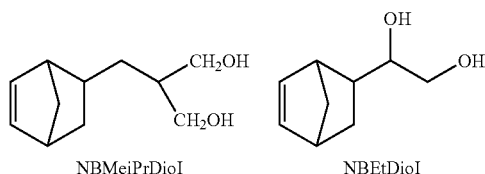
NBMeiPrDiol   NBEtDiol
-continued
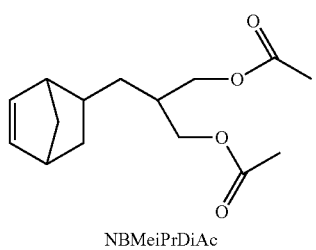
NBMeiPrDiAc
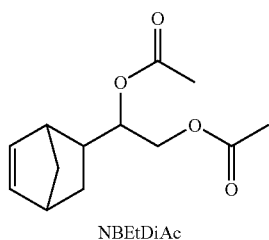
NBEtDiAc
Monomer Group BB
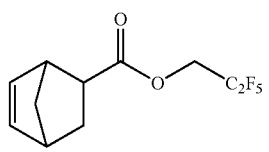
FPCNB
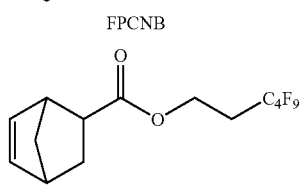
FPeCNB
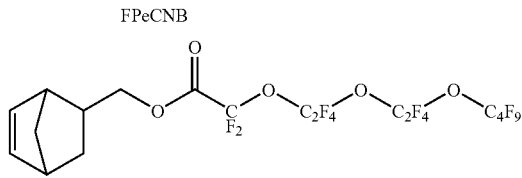
C10GAcNB
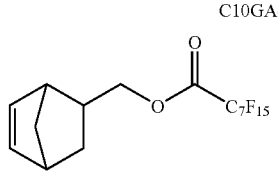
C8AcNB
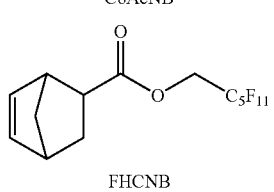
FHCNB
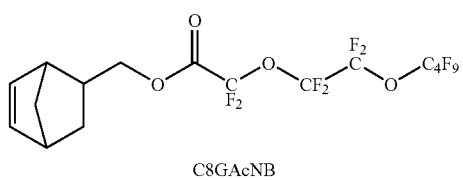
C8GAcNB

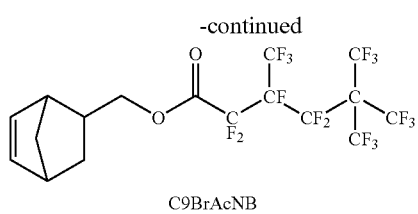
C9BrAcNB

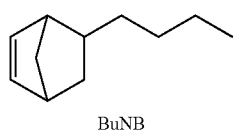
BuNB

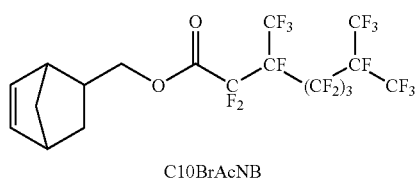
C10BrAcNB

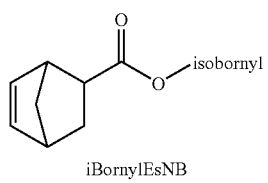
iBornylEsNB

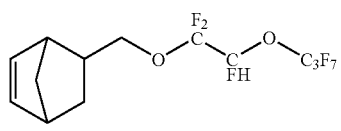
PPVENB

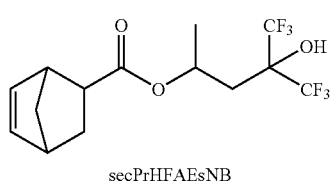
secPrHFAEsNB

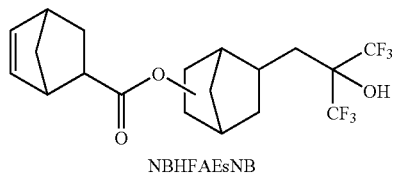
NBHFAEsNB

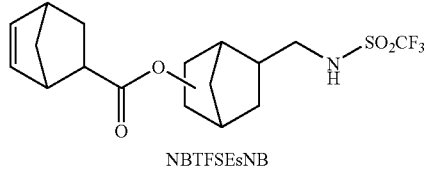
NBTFSEsNB

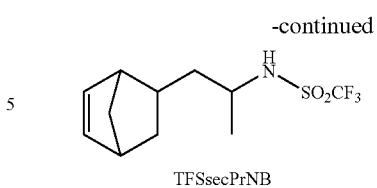
TFSsecPrNB

Monomer Group CC

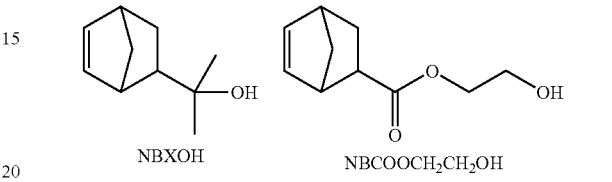
NBXOH    NBCOOCH$_2$CH$_2$OH

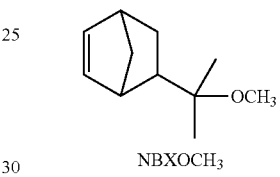
NBXOCH$_3$

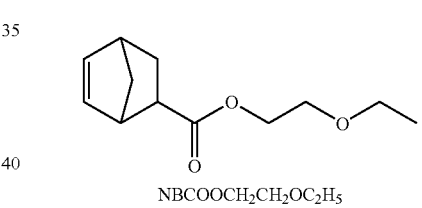
NBCOOCH$_2$CH$_2$OC$_2$H$_5$

NBCH$_2$CH$_2$OC$_3$H$_7$

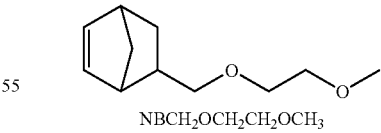
NBCH$_2$OCH$_2$CH$_2$OCH$_3$

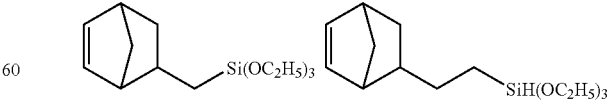

Exemplary polymers of embodiments in accordance with Structural Formula A include, but are not limited to, the structures depicted in Polymer Formulae A through G in Polymer Group DD represented below:

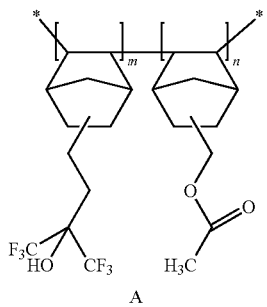

A

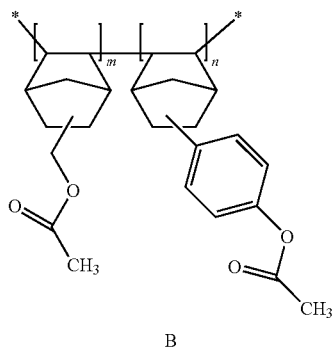

B

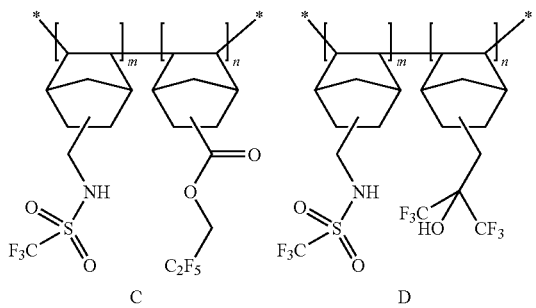

C          D

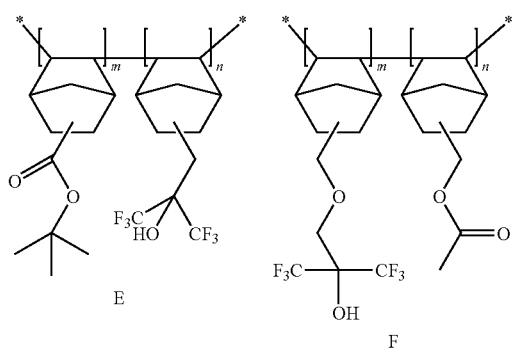

E          F

Polymer Group DD

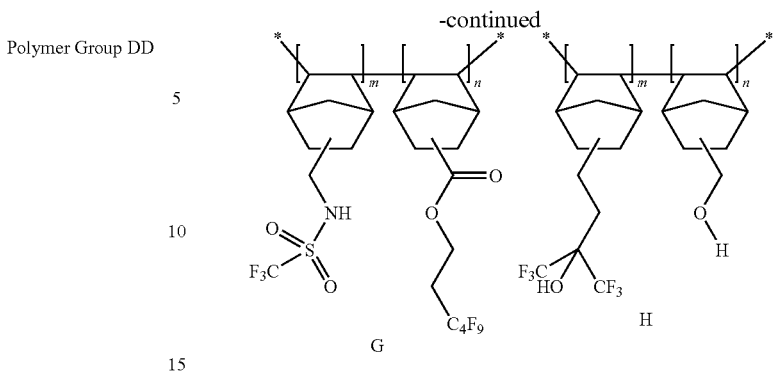

G          H

Embodiments of the invention are directed to any polymers having repeating units derived from monomers in accordance with Structural Formula A. Such repeating units are derived through the polymerization of such monomers by 2, 3 enchainment addition. Thus any repeating unit (A*) is derived from monomer (B*) as shown below:

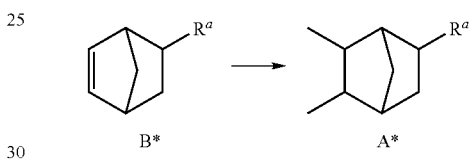

B*          A*

For embodiments in accordance with the present invention, a palladium catalyst complex and a CTAA are added to norbornene-type monomers to cause such monomers to polymerize as described above. Generally, such embodiments employ single component palladium catalyst complexes such as are described and disclosed in Published U.S. Patent Application Number 2005/0187398 A1 in the text of paragraphs [0011] through [0113] and in Examples 1 through 35, which is incorporated herein by reference. In other embodiments, palladium catalyst complexes such as those described and disclosed in U.S. Pat. No. 6,455,650 B1 in the text beginning at column 3 line 11 and continuing through column 29 line 45 and pertinent palladium containing examples, which is incorporated herein by reference, are used.

In the '650 patent, catalyst complex is generally described as:

$$[(R')_zM(L')_x(L'')_y]_b[WCA]_d \qquad \text{Catalyst Formula I}$$

where M represents a Group 10 transition metal such as palladium; R' represents an anionic hydrocarbyl ligand; L' represents a Group 15 neutral electron donor ligand such as a phosphorus containing ligand; L" represents a labile neutral electron donor ligand; x is 1 or 2; y is 0, 1, 2, or 3; wherein the sum of x, y, and z is 4; and b and d are numbers representing the number of times the cation complex and weakly coordinating counter-anion complex (WCA), respectively, are taken to balance the electronic charge of the overall catalyst complex.

In the '398 published application, the catalyst complexes are described as being derived from:

$$[(E(R)_3)_aPd(Q)(LB)_b]_p[WCA]_r \qquad \text{Catalyst Formula Ia}$$

$$[(E(R)_3)(E(R)_2R^*)Pd(LB)]_p[WCA]_r \qquad \text{Catalyst Formula Ib}$$

Where in Catalyst Formula Ia, $E(R)_3$ represents a Group 15 neutral electron donor ligand where E is selected from a Group 15 element of the Periodic Table of the Elements, and R independently represents hydrogen (or one of its isotopes), or an anionic hydrocarbyl containing moiety; Q is an anionic ligand selected from a carboxylate, thiocarboxylate, and dithiocarboxylate group; LB is a Lewis base; WCA represents a weakly coordinating anion; a represents an integer of 1, 2, or, 3; b represents an integer of 0, 1, or 2, where the sum of a+b is 1, 2, or 3; and p and r are integers that represent the number of times the palladium cation and the weakly coordinating anion are taken to balance the electronic charge on the structure of Catalyst Formula Ia. In an exemplary embodiment, p and r are independently selected from an integer of 1 and 2. And where in Formula Ib, E, R, r, p and $E(R)_3$ are as defined for Catalyst Formula Ia, and where $E(R)_2R^*$ also represents a Group 15 neutral electron donor ligand where $R^*$ is an anionic hydrocarbyl containing moiety, bonded to the Pd and having a β hydrogen with respect to the Pd center. In an exemplary embodiment, p and r are independently selected from an integer of 1 and 2.

It has also been found that in Catalyst Formula Ia, Q can be selected from acetyl acetonate ("acac") and its derivatives. Such derivatives can be thio derivatives where one or more of the acac oxygens are replaced with a sulfur atom or alkyl derivatives where one or more acac hydrogens are replaced with an appropriate substituent. Where Q is acac or a derivative thereof, a is an integer of 1 or 2; b is an integer of 0 or 1, and the sum of a+b is 1 or 2.

As stated herein, a weakly coordinating anion (WCA) is defined as a generally large and bulky anion capable of delocalization of its negative charge, and which is only weakly coordinated to a palladium cation of the present invention and is sufficiently labile to be displaced by solvent, monomer or neutral Lewis base. More specifically, the WCA functions as a stabilizing anion to the palladium cation but does not transfer to the cation to form a neutral product. The WCA anion is relatively inert in that it is non-oxidizing, non-reducing, and non-nucleophilic.

The importance of WCA charge delocalization depends, to some extent, on the nature of the transition metal comprising the cationic active species. It is advantageous that the WCA either does not coordinate to the transition metal cation, or is one which is only weakly coordinated to such cation. Further, it is advantageous that the WCA not transfer an anionic substituent or fragment to the cation so as to cause it to form a neutral metal compound and a neutral by-product from such transfer. Therefore, useful WCAs in accordance with embodiments of this invention are those which are compatible, stabilize the cation in the sense of balancing its ionic charge, and yet retain sufficient liability to permit displacement by an olefinically unsaturated monomer during polymerization. Additionally, such useful WCAs are those of sufficient molecular size to partially inhibit or help to prevent neutralization of the late-transition-metal cation by Lewis bases other than the polymerizable monomers that may be present in the polymerization process. While not wishing to be bound by any theory, it is believed that the WCAs in accordance with embodiments of the present invention can include anions (listed more to less coordinating), such as trifluoromethanesulfonate $(CF_3SO_2^-)$, tris(trifluoromethyl)methide $((CF_3SO_2)_3C)$, triflimide, $BF_4^-$, $BPh_4^-$, $PF_6^-$, $SbF_6^-$, tetrakis(pentafluorophenyl)borate (herein abbreviated FABA), and tetrakis[3,5-bis(trifluoromethyl)phenyl]borate $([BAr^f]^-)$. Furthermore, it is believed the catalytic activity of the proinitiators of this invention increases with decreasing coordination of the WCA. Hence, it is believed that in order to obtain a desired catalytic activity, a WCA and $ER_3$ should be selected in concert with one another.

As stated herein, a neutral electron donor is defined as any ligand which when removed from the palladium metal center in its closed shell electron configuration, has a neutral charge. Further, an anionic hydrocarbyl moiety is defined as any hydrocarbyl group which when removed from 'E' (see Formulae Ia) in its closed shell electron configuration, has a negative charge; and a Lewis base is defined as "a basic substance furnishing a pair of electrons for a chemical bond," hence it is a donor of electron density.

For such catalysts useful in embodiments in accordance with the present invention, E is a Group 15 element of the Periodic Table of the Elements selected from phosphorus (P), arsenic (As), antimony (Sb), and bismuth (Bi). In Catalyst Formula Ia, the anionic hydrocarbyl containing moiety R is independently selected from, but not limited to, H, linear and branched $(C_1-C_{20})$alkyl, $(C_3-C_{12})$cycloalkyl, $(C_2-C_{12})$alkenyl, $(C_3-C_{12})$ cycloalkenyl, $(C_5-C_{20})$polycycloalkyl, $(C_5-C_{20})$polycycloalkenyl, and $(C_6-C_{12})$aryl, and two or more R groups taken together with E can form a heterocyclic or heteropolycyclic ring containing 5 to 24 atoms. Representative heteroatoms include, but are not limited to, oxygen and nitrogen. An exemplary embodiment where two R groups are taken together with E (where E is phosphorus) is eicosyl phobane phosphine (EPN). In Formula Ib, the anionic hydrocarbyl containing moiety $R^*$ is selected from, but not limited to, linear and branched $(C_2-C_{20})$alkyl, $(C_3-C_{12})$cycloalkyl, $(C_2-C_{12})$alkenyl, $(C_3-C_{12})$cycloalkenyl, $(C_5-C_{20})$ polycycloalkyl, $(C_5-C_{20})$polycycloalkenyl with the proviso that such anionic hydrocarbyl containing moiety, when bonded to the Pd, will have at least one, hydrogen with respect to the Pd center.

Representative alkyl groups include, but are not limited to, methyl, ethyl, propyl, isopropyl, n-butyl, isobutyl, sec-butyl, tert-butyl, pentyl and neopentyl. Representative alkenyl groups include, but are not limited to, vinyl, allyl, iso-propenyl and iso-butenyl. Representative cycloalkyl groups include, but are not limited to, cyclopropyl, cyclobutyl, cyclopentyl, cyclohexyl, cycloheptyl and cyclooctyl. Representative polycycloalkyl groups include, but are not limited to, norbornyl and adamantyl. Representative polycycloalkenyl groups include, but are not limited to, norbornenyl and adamantenyl. Representative aryl and aralkyl groups include, but are not limited to, phenyl, naphthyl and benzyl.

Exemplary Group 15 neutral electron donor ligands are, among others, phosphine ligands such as di-t-butylcyclohexylphosphine, dicyclohexyl-t-butylphosphine, tricyclohexylphosphine, tricyclopentylphosphine, dicyclohexyladamantylphosphine, cyclohexyldiadamantylphosphine, triisopropylphosphine, di-tert-butylisopropylphosphine and diisopropyl-tert-butylphosphine. Further it is to be recognized that two phosphine groups can be taken together to form a diphosphine chelating ligand. Exemplary diphosphine chelating ligands include, but are not limited to, bis(dicyclohexylphosphino)methane; 1,2-bis(dicyclohexylphosphino)ethane; 1,3-bis(dicyclohexylphosphino)propane; 1,4-bis(dicyclohexylphosphino)butane; and 1,5-bis(dicyclohexylphosphino)pentane. Other suitable diphosphine ligands are exemplified in the '650 patent previously incorporated herein.

Lewis bases in accordance with the present invention can be any compound that donates an electron pair. The Lewis base can be water or selected from the following type of compounds: alkyl ethers, cyclic ethers, aliphatic or aromatic ketones, primary alcohols, nitriles, cyclic amines especially pyridines and pyrazines, and trialkyl or triaryl phosphites.

Exemplary Lewis base ligands include, but are not limited to, water, dimethyl ether, diethyl ether, tetrahydrofuran, dioxane, acetone, benzophenone, acetophenone, methanol, isopropanol, acetonitrile, benzonitrile, tert-butylnitrile, tert-butylisocyanide, xylylisocyanide, pyridine, dimethylaminopyridine, 2,6-dimethylpyridine, 4-dimethylaminopyridine, tetramethylpyridine, 4-methylpyridine, pyrazine, tetramethylpyrazine, triisopropylphosphite, triphenylphosphite and triphenylphosphine oxide. Phosphines can also be included as exemplary Lewis bases so long as they are added to the reaction medium during the formation of the single component catalyst of the invention. Examples of Lewis base phosphines include, but are not limited to, triisopropylphosphine, tricyclohexylphosphine, tricyclopentylphosphine and triphenylphosphine.

WCAs in accordance with the present invention are selected from borates and aluminates, boratobenzene anions, carborane, halocarborane and phosphaborane anions. Representative borate anions include, but are not limited to, tetrakis(pentafluorophenyl)borate (FABA), tetrakis(3,5-bis(trifluoromethyl)phenyl)borate and tetrakis(2-fluorophenyl)borate. Other useful weakly coordinating anions, for example other borates and aluminates, boratobenzene anions, carborane, halocarborane and phosphaborane anions, can be found in the '398 published application, previously incorporated herein.

Exemplary salts of weakly coordinating anions are N,N-dimethylanilinium tetrakis(pentafluorophenyl)borate (DANFABA) and lithium tetrakis(pentafluorophenyl)borate 2.5 diethyletherate (LiFABA), among others.

Exemplary embodiments in accordance with the present invention utilize one or more catalysts selected from trans-[Pd((OAc)(MeCN)(P(i-propyl)$_3$)$_2$]FABA, trans-[Pd(OAc)(NCC(CH$_3$)$_3$)(P(i-propyl)$_3$)$_2$]FABA, trans-[Pd(OAc)(OC(C$_6$H$_5$)$_2$)(P(i-propyl)$_3$)$_2$]FABA, trans-[Pd(OAc)(HOCH(CH$_3$)$_2$)(P(i-propyl)$_3$)$_2$]FABA, trans-[Pd(OAc)(MeCN)(P(cyclohexyl)$_3$)$_2$]FABA, trans-[Pd(OAc)(MeCN)(P(cyclohexyl)$_2$(t-butyl))$_2$]FABA, [Pd(OAc)(MeCN)(P(octyl)$_3$)] FABA, [Pd(OAc)(MeCN)(EPN)$_2$]FABA, [Pd(OAc)(MeCN)(EPN)]FABA, Pd(OAc)$_2$(P(cyclohexyl)$_3$)$_2$ FABA, Pd(OAc)$_2$(P(i-propyl)$_3$)$_2$ FABA, Pd(OAc)$_2$(P(i-propyl)$_2$(phenyl))$_2$ FABA, [Pd(acac)(MeCN)(P(octyl)$_3$)]FABA, [Pd(acac)(MeCN)(P(i-propyl)$_3$)]FABA, [Pd(acac)(MeCN)(EPN)]FABA, [Pd(acac)(NCC(CH$_3$)$_3$)(P(i-propyl)$_3$)]FABA, trans-[Pd(acac)(OC(C$_6$H$_5$)$_2$)(P(i-propyl)$_3$)]FABA, trans-[Pd(acac)(HOCH(CH$_3$)$_2$)(P(i-propyl)$_3$)]FABA, and trans-[Pd(acac)(MeCN)(P(cyclohexyl)$_3$)]FABA.

For embodiments in accordance with the present invention, a non-phosphorus containing, or phosphorous-free, palladium catalyst complex and a CTAA are added to norbornene-type monomers to cause such monomers to polymerize by 2,3-enchainment addition. In some such embodiments, the non-phosphorus containing palladium catalyst employed is depicted by Formula II:

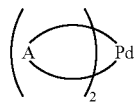

Catalyst Formula II where A is a bidentate monoanionic ligand represented by Catalyst Formula III, below:

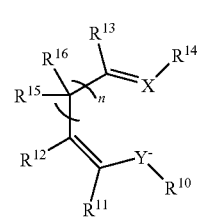

Catalyst Formula III and where each of X and Y are independently selected from O, N, or S and where $R^{10}$, $R^{11}$, $R^{12}$, $R^{13}$, $R^{14}$, $R^{15}$ and $R^{16}$ independently represent hydrogen, methyl, linear or branched $C_2$-$C_{10}$ alkyl, $C_3$-$C_{10}$ cycloalkyl, $C_7$-$C_{20}$ aralkyl, or $C_6$-$C_{24}$ aryl or substituted aryl, n represents an integer of 0, 1, or 2; and when either X or Y are O or S, $R^{10}$ and $R^{14}$, respectively, do not exist.

Further, $R^{11}$ and $R^{12}$ and the carbons to which they are attached, or $R^{13}$ and the carbon to which it is attached and $R^{14}$ and X can form a substituted or unsubstituted aromatic ring.

In some representations of Catalyst Formula III the bidentate monoanionic ligand (X—Y) is a chelate characterized by the presence of bonds from two bonding sites within the same ligand to a central metal atom. In other representations the bidentate monoanionic ligand is a hemilabile group or ligand, that is to say a chelate characterized by the presence of bonds from two bonding sites within the same ligand to a central metal atom, where one of the bonds is readily broken by a solvent to render a metal center bound to one terminus of the anionic group and thereby generating a vacant coordination site at the metal center.

In Catalyst Formula III, the bidentate anionic species is believed to be generated from the neutral species HX—Y. The groups X and Y are selected from O, N, or S, where $R^{10}$, $R^{11}$, $R^{12}$, $R^{13}$ and $R^{14}$, as shown in X—Y(a) and X—Y(b), are as defined above. Exemplary X—Y ligands are β-diketonato (O—O), β-diketiminato (N—N), β-ketiminato (N—O) and Schiff base (N—O) ligands. Thus such bidentate anionic species are believed to exist in tautomeric forms as shown below:

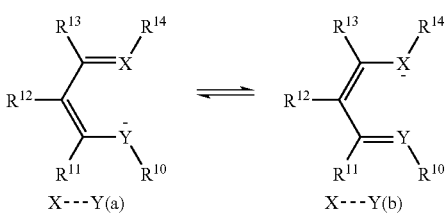

X---Y(a)        X---Y(b)

In other embodiments of the present invention, the bidentate anion X—Y is selected from:

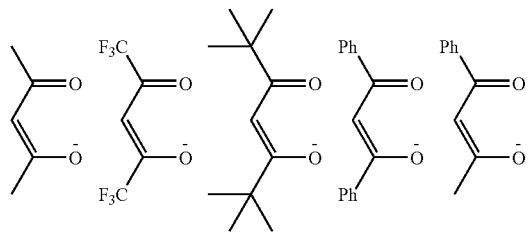

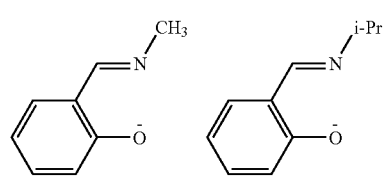

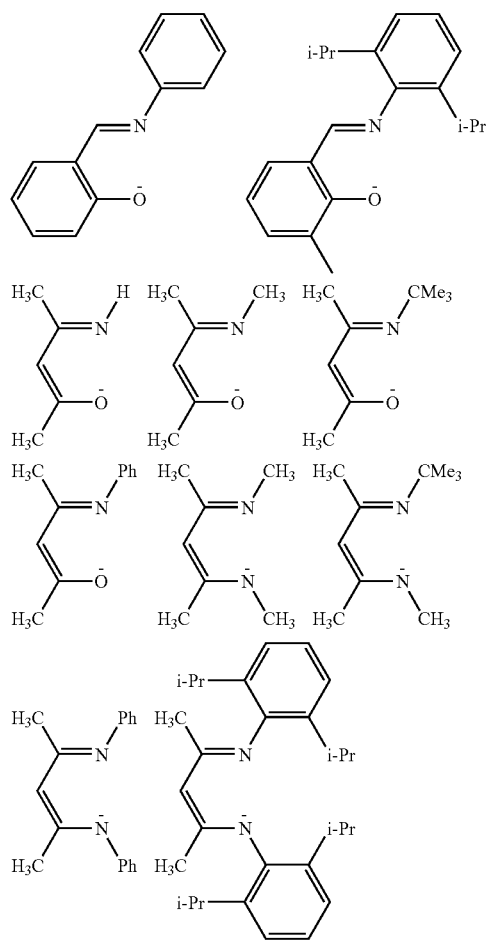

In still other embodiments the bidentate anion X—Y is one of the tropolone derivatives shown below or a derivative of any other appropriate substituted or unsubstituted hydrocarbyl.

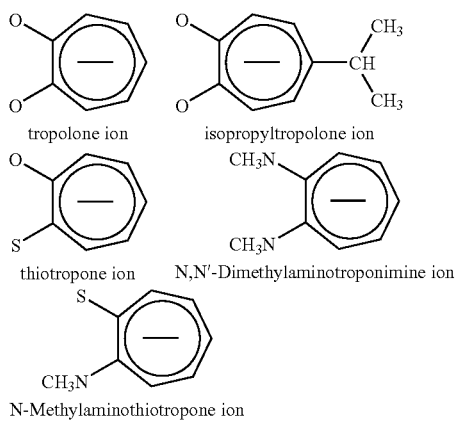

In some embodiments of the present invention, the palladium source and X—Y sources are selected from Pd(acac)$_2$, bis(trifluoroacetylacetonate)Pd, bis(hexafluoroacetylacetonate)Pd; bis(dibenzoylmethanate)Pd, bis(benzoylacetonate)Pd, bis(tetramethylheptanedionate)Pd, or bis(tropolonato) palladium (II).

Some other embodiments in accordance with the present invention encompass non-phosphorus containing palladium catalysts represented by Catalyst Formula IV, shown below:

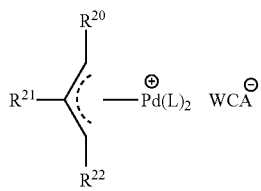

IV where L is nitrogen, oxygen, sulfur, an alkene, or chlorinated alkane containing neutral labile donor ligands and WCA is a weakly coordinating anion; and where $R^{20}$, $R^{21}$ and $R^{22}$ each independently represent a hydrogen, a halogen, a linear or branched $C_1$ to $C_5$ alkyl, a $C_5$ to $C_{10}$ cycloalkyl, a linear or branched $C_1$ to $C_5$ alkenyl, $C_6$ to $C_{30}$ aryl, $C_7$ to $C_{30}$ aralkyl, where each of the above can be optionally substituted with a substituent selected from a linear or branched $C_1$ to $C_5$ alkyl, a linear or branched $C_1$ to $C_5$ haloalkyl, one or more halogens and a phenyl which can be optionally substituted with a linear or branched $C_1$ to $C_5$ alkyl, a linear or branched $C_1$ to $C_5$ haloalkyl, and one or more halogens. Further any two of $R^{20}$, $R^{21}$ and $R^{22}$ can be linked together with the carbon atoms to which they are attached to form a cyclic or multicyclic ring which can be optionally substituted with a linear or branched $C_1$ to $C_5$ alkyl, a linear or branched $C_1$ to $C_5$ haloalkyl, and one or more halogens. Exemplary allylic ligands that are encompassed by the cationic complexes of the present invention include, but are not limited to, allyl, 2-chloroallyl, crotyl, 1,1-dimethyl allyl, 2-methylallyl, 1-phenylallyl, 2-phenylallyl and β-pinenyl.

Additional examples of allyl ligands are found in R. G. Guy and B. L. Shaw, Advances in Inorganic Chemistry and Radiochemistry, Vol. 4, Academic Press Inc., New York, 1962; J. Birmingham, E. de Boer, M. L. H. Green, R. B. King, R. Koster, P. L. I. Nagy, G. N. Schrauzer, Advances in Organometallic Chemistry, Vol. 2, Academic Press Inc., New York, 1964; W. T. Dent, R. Long and A. J. Wilkinson, J. Chem. Soc., (1964) 1585; and H. C. Volger, Rec. Trav. Chim. Pay Bas, 88 (1969) 225.

Representative labile neutral electron donor ligands (L) include, but are not limited to, reaction diluents, reaction monomers, DMF, DMSO, dienes including $C_4$ to $C_{10}$ aliphatic and $C_4$ to $C_{10}$ cycloaliphatic dienes representative dienes include butadiene, 1,6-hexadiene, and cyclooctadiene (COD), water, chlorinated alkanes, alcohols, ethers, ketones, nitriles, arenes, organic carbonates and esters. Representative chlorinated alkanes include but are not limited to dichloromethane, 1,2-dichloroethane, and carbon tetrachloride.

Suitable alcohol ligands can be selected from alcohols of the formula $R^{17}OH$, where $R^{17}$ represents a linear and branched $C_1$ to $C_{20}$ alkyl, a linear and branched $C_1$ to $C_{20}$ haloalkyl, a substituted and unsubstituted $C_3$ to $C_{20}$ cycloalkyl, a substituted and unsubstituted $C_6$ to $C_{18}$ aryl, and a substituted and unsubstituted $C_6$ to $C_{18}$ aralkyl. When substituted, the cycloalkyl, aryl and aralkyl groups can be monosubstituted or multisubstituted, where the substituents are independently selected from hydrogen, linear and branched $C_1$ to $C_{12}$ alkyl, linear and branched $C_1$ to $C_5$ haloalkyl, linear and branched $C_1$ to $C_5$ alkoxy, $C_6$ to $C_{12}$ aryl, and halogen selected from chlorine, bromine, and fluorine. Representative alcohols include, but are not limited to, methanol, ethanol, n-propanol, isopropanol, butanol, hexanol, t-butanol, neopentanol, phenol, 2,6-di-1-propylphenol, 4-t-octylphenol, 5-norbornene-2-methanol, and dodecanol.

Suitable ether ligands and thioether ligands can be selected from ethers and thioethers of the formulae ($R^{18}$—O—$R^{18}$) and ($R^{18}$—S—$R^{18}$), respectively, where $R^{18}$ independently represents linear and branched $C_1$ to $C_{10}$ alkyl radicals, linear and branched $C_1$ to $C_{20}$ haloalkyl radicals, substituted and unsubstituted $C_3$ to $C_{20}$ cycloalkyl radicals, linear and branched $C_1$ to $C_{20}$ alkoxy radicals, substituted and unsubstituted $C_6$ to $C_{18}$ aryl radicals, and substituted and unsubstituted $C_6$ to $C_{18}$ aralkyl radicals. When substituted, the cycloalkyl, aryl and aralkyl groups can be monosubstituted or multisubstituted, where such substituents are independently selected from hydrogen, and radicals such as linear and branched $C_1$ to $C_{12}$ alkyl, linear and branched $C_1$ to $C_5$ haloalkyl, linear and branched $C_1$ to $C_5$ alkoxy, and $C_6$ to $C_{12}$ aryl. Further, such substituents can be a halogen selected from chlorine, bromine, and fluorine. Still further, each $R^{18}$ can be taken together with the oxygen or sulfur atom to which they are attached to form a cyclic ether or cyclic thioether, respectively. Representative ethers and thioethers include, but are not limited to, dimethyl ether, dibutyl ether, methyl-t-butyl ether, di-1-propyl ether, diethyl ether, dioctyl ether, 1,4-dimethoxyethane, THF, 1,4-dioxane and tetrahydrothiophene.

The nitrile ligands can be represented by the formula $R^{12'}CN$, where $R^{12'}$ represents hydrogen, linear and branched $C_1$ to $C_{20}$ alkyl, linear and branched $C_1$ to $C_{20}$ haloalkyl, substituted and unsubstituted $C_3$ to $C_{20}$ cycloalkyl, substituted and unsubstituted $C_6$ to $C_{18}$ aryl, and substituted and unsubstituted $C_6$ to $C_{18}$ aralkyl. When substituted, the cycloalkyl, aryl and aralkyl groups can be monosubstituted or multisubstituted, where the substituents are independently selected from hydrogen, linear and branched $C_1$ to $C_{12}$ alkyl, linear and branched $C_1$ to $C_5$ haloalkyl, linear and branched $C_1$ to $C_5$ alkoxy, $C_6$ to $C_{12}$ aryl, and halogen selected from chlorine, bromine, and fluorine. Representative nitriles include but are not limited to acetonitrile, propionitrile, benzonitrile, benzyl cyanide, and 5-norbornene-2-carbonitrile.

The arene ligands can be selected from substituted and unsubstituted $C_6$ to $C_{12}$ arenes containing monosubstitution or multisubstitution, where the substituents are independently selected from hydrogen, linear and branched $C_1$ to $C_{12}$ alkyl, linear and branched $C_1$ to $C_5$ haloalkyl, linear and branched $C_1$ to $C_5$ alkoxy, $C_6$ to $C_{12}$ aryl, and halogen selected from chlorine, bromine, and fluorine. Representative arenes include but are not limited to toluene, benzene, o-, m-, and p-xylenes, mesitylene, fluorobenzene, o-difluorobenzene, p-difluorobenzene, chlorobenzene, pentafluorobenzene, o-dichlorobenzene, and hexafluorobenzene.

Representative carbonates include but are not limited to ethylene carbonate and propylene carbonate.

Representative esters include but are not limited to ethyl acetate and i-amyl acetate.

The weakly coordinating counteranion complex, [WCA], of Formula IV can be selected from borates and aluminates, boratobenzene anions, carborane and halocarborane anions.

The borate and aluminate weakly coordinating counteranions are represented by WCA Formulae V and VI below:

$$[M'(R^{24'})(R^{25'})(R^{26'})(R^{27'})^-] \qquad\qquad V$$

$$[M'(OR^{28'})(OR^{29'})(OR^{30'})(OR^{31'})^-] \qquad\qquad VI$$

where in WCA Formula V M' is boron or aluminum and $R^{24'}$, $R^{25'}$, $R^{26'}$, and $R^{27'}$ independently represent fluorine, linear and branched $C_1$ to $C_{10}$ alkyl, linear and branched $C_1$ to $C_{10}$ alkoxy, linear and branched $C_3$ to $C_5$ haloalkenyl, linear and branched $C_3$ to $C_{12}$ trialkylsiloxy, $C_{18}$ to $C_{36}$ triarylsiloxy, substituted and unsubstituted $C_6$ to $C_{30}$ aryl, and substituted and unsubstituted $C_6$ to $C_{30}$ aryloxy groups where $R^{24'}$ to $R^{27'}$ can not all simultaneously represent alkoxy or aryloxy groups. When substituted the aryl groups can be monosubstituted or multisubstituted, where the substituents are independently selected from linear and branched $C_1$ to $C_5$ alkyl, linear and branched $C_1$ to $C_5$ haloalkyl, linear and branched $C_1$ to $C_5$ alkoxy, linear and branched $C_1$ to $C_5$ haloalkoxy, linear and branched $C_1$ to $C_{12}$ trialkylsilyl, $C_6$ to $C_{18}$ triarylsilyl, and halogen selected from chlorine, bromine, and fluorine. Representative borate anions under WCA Formula V include but are not limited to tetrakis(pentafluorophenyl)borate, tetrakis(3,5-bis(trifluoromethyl)phenyl)borate, tetrakis(2-fluorophenyl)borate, tetrakis(3-fluorophenyl)borate, tetrakis(4-fluorophenyl)borate, tetrakis(3,5-difluorophenyl)borate, tetrakis(2,3,4,5-tetrafluorophenyl)borate, tetrakis(3,4,5,6-tetrafluorophenyl)borate, tetrakis(3,4,5-trifluorophenyl)borate, methyltris(perfluorophenyl)borate, ethyltris(perfluorophenyl)borate, phenyltris(perfluorophenyl)borate, tetrakis(1,2,2-trifluoroethylenyl)borate, tetrakis(4-tri-1-propylsilyltetrafluorophenyl)borate, tetrakis(4-dimethyl-tert-butylsilyltetrafluorophenyl)borate, (triphenylsiloxy)tris(pentafluorophenyl)borate, (octyloxy)tris(pentafluorophenyl)borate, tetrakis[3,5-bis[1-methoxy-2,2,2-trifluoro-1-(trifluoromethyl)ethyl]phenyl]borate, tetrakis[3-[1-methoxy-2,2,2-trifluoro-1-(trifluoromethyl)ethyl]-5-(trifluoromethyl)phenyl]borate, and tetrakis[3-[2,2,2-trifluoro-1-(2,2,2-trifluoroethoxy)-1-(trifluoromethyl)ethyl]-5-(trifluoromethyl)phenyl]borate.

Representative aluminate anions under Formula WCA V include but are not limited to tetrakis(pentafluorophenyl)aluminate, tris(perfluorobiphenyl)fluoroaluminate, (octyloxy)tris(pentafluorophenyl)aluminate, tetrakis(3,5-bis(trifluoromethyl)phenyl)aluminate, and methyltris(pentafluorophenyl)aluminate.

In WCA Formula VI, above, M' is boron or aluminum, $R^{28'}$, $R^{29'}$, $R^{30'}$, and $R^{31'}$ independently represent linear and branched $C_1$ to $C_{10}$ alkyl, linear and branched $C_1$ to $C_{10}$ haloalkyl, $C_2$ to $C_{10}$ haloalkenyl, substituted and unsubstituted $C_6$ to $C_{30}$ aryl, and substituted and unsubstituted $C_7$ to $C_{30}$ aralkyl groups, subject to the proviso that at least three of $R^{28'}$ to $R^{31'}$ must contain a halogen containing substituent. When substituted the aryl and aralkyl groups can be monosubstituted or multisubstituted, where the substituents are independently selected from linear and branched $C_1$ to $C_5$ alkyl, linear and branched $C_1$ to $C_5$ haloalkyl, linear and branched $C_1$ to $C_5$ alkoxy, linear and branched $C_1$ to $C_{10}$ haloalkoxy, and halogen selected from chlorine, bromine, and fluorine. The groups $OR^{28'}$ and $OR^{29'}$ can be taken together to form a chelating substituent represented by $-O-R^{32'}-O-$, where the oxygen atoms are bonded to M' and $R^{32'}$ is a divalent radical selected from substituted and unsubstituted $C_6$ to $C_{30}$ aryl and substituted and unsubstituted $C_7$ to $C_{30}$ aralkyl. Generally, the oxygen atoms are bonded, either directly or through an alkyl group, to the aromatic ring in the ortho or meta position. When substituted the aryl and aralkyl groups can be monosubstituted or multisubstituted, where the substituents are independently selected from linear and branched $C_1$ to $C_5$ alkyl, linear and branched $C_1$ to $C_5$ haloalkyl, linear and branched $C_1$ to $C_5$ alkoxy, linear and branched $C_1$ to $C_{10}$ haloalkoxy, and halogen selected from chlorine, bromine, and fluorine. Representative structures of divalent $R^{32'}$ radicals are illustrated below:

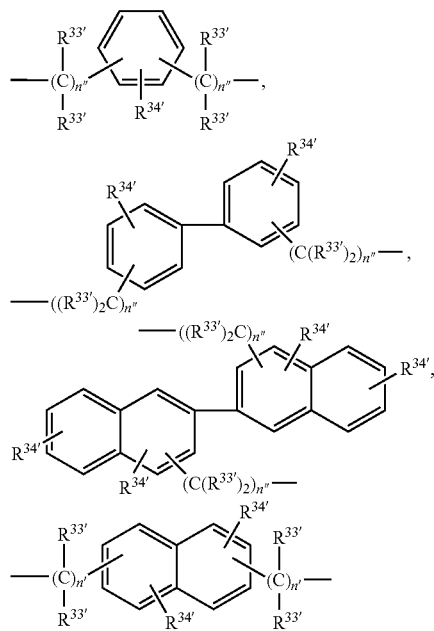

where $R^{33'}$ independently represents hydrogen, linear and branched $C_1$ to $C_5$ alkyl, linear and branched $C_1$ to $C_5$ haloalkyl, and halogen selected from chlorine, bromine, and fluorine; $R^{34'}$ can be a monosubstituent or taken up to four times about each aromatic ring depending on the available valence on each ring carbon atom and independently represents hydrogen, linear and branched $C_1$ to $C_5$ alkyl, linear and branched $C_1$ to $C_5$ haloalkyl, linear and branched $C_1$ to $C_5$ alkoxy, linear and branched $C_1$ to $C_{10}$ haloalkoxy, and halogen selected from chlorine, bromine, and fluorine; and n" independently represents an integer from 0 to 6. It should be recognized that when n" is 0 the oxygen atom in the formula $-O-R^{32'}-O-$ is bonded directly to a carbon atom in the aromatic ring represented by $R^{32'}$. In the above divalent structural formulae the oxygen atom(s), i.e., when n" is 0, and the methylene or substituted methylene group(s), $-(C(R^{33'})_2)_{n''}-$, are generally located on the aromatic ring in the ortho or meta positions. Representative chelating groups of the formula $-O-R^{32'}-O-$ include but are not limited to are 2,3,4,5-tetrafluorobenzenediolate $(-OC_6F_4O-)$, 2,3,4,5-tetrachlorobenzenediolate $(-OC_6Cl_4O-)$, 2,3,4,5-tetrabromobenzenediolate $(-OC_6Br_4O-)$, and bis(1,1'-bitetrafluorophenyl-2,2'-diolate).

Representative borate and aluminate anions represented by WCA Formula VI include but are not limited to $[B(OC(CF_3)_3)_4]^-$, $[B(OC(CF_3)_2CH_3)_4]^-$, $[B(OC(CF_3)_2H)_4]^-$, $[B(OC(CF_3)(CH_3)H)_4]^-$, $[Al(OC(CF_3)_2Ph)_4]^-$, $[B(OCH_2(CF_3)_2)_4]^-$, $[Al(OC(CF_3)_2C_6H_4CH_3)_4]^-$, $[Al(OC(CF_3)_3)_4]^-$, $[Al(OC(CF_3)(CH_3)H)_4]^-$, $[Al(OC(CF_3)_2H)_4]^-$, $[Al(OC(CF_3)_2C_6H_4\text{-}4\text{-}i\text{-}Pr)_4]^-$, $[Al(OC(CF_3)_2C_6H_4\text{-}4\text{-}t\text{-}butyl)_4]^-$, $[Al(OC(CF_3)_2C_6H_4\text{-}4\text{-}SiMe_3)_4]^-$, $[Al(OC(CF_3)_2C_6H_4\text{-}4\text{-}Si\text{-}i\text{-}Pr_3)_4]^-$, $[Al(OC(CF_3)_2C_6H_2\text{-}2,6\text{-}(CF_3)_2\text{-}4\text{-}si\text{-}i\text{-}Pr_3)_4]^-$, $[Al(OC(CF_3)_2C_6H_3\text{-}3,5\text{-}(CF_3)_2)_4]^-$, $[Al(OC(CF_3)_2C_6H_2\text{-}2,4,6\text{-}(CF_3)_3)_4]^-$, and $[Al(OC(CF_3)_2C_6F_5)_4]^-$.

Boratobenzene anions useful as the weakly coordinating counteranion are represented by WCA Formula VII below:

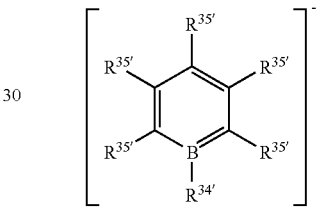

VII where $R^{34'}$ is selected from fluorine, fluorinated hydrocarbyl, perfluorocarbyl, and fluorinated and perfluorinated ethers. As used here and throughout the specification, the term halohydrocarbyl means that at least one hydrogen atom on the hydrocarbyl radical, e.g., alkyl, alkenyl, alkynyl, cycloalkyl, aryl, and aralkyl groups, is replaced with a halogen atom selected from chlorine, bromine, iodine, and fluorine (e.g., haloalkyl, haloalkenyl, haloalkynyl, halocycloalkyl, haloaryl, and haloaralkyl). The term fluorohydrocarbyl means that at least one hydrogen atom on the hydrocarbyl radical is replaced by fluorine. The degree of halogenation can range from at least one hydrogen atom being replaced by a halogen atom (e.g., a monofluoromethyl group) to full halogenation (perhalogenation) where all hydrogen atoms on the hydrocarbyl group have been replaced by a halogen atom (e.g., perhalocarbyl such as trifluoromethyl(perfluoromethyl)). Some of the fluorinated hydrocarbyl and perfluorocarbyl radicals employed in embodiments in accordance with the present invention contain 1 to 24 carbon atoms, others 1 to 12 carbon atoms and still others 6 carbon atoms and can be linear or branched, cyclic, or aromatic. The fluorinated hydrocarbyl and perfluorocarbyl radicals include but are not limited to fluorinated and perfluorinated linear and branched $C_1$ to $C_{24}$ alkyl, fluorinated and perfluorinated $C_3$ to $C_{24}$ cycloalkyl, fluorinated and perfluorinated $C_2$ to $C_{24}$ alkenyl, fluorinated and perfluorinated $C_3$ to $C_{24}$ cycloalkenyl, fluorinated and perfluorinated $C_6$ to $C_{24}$ aryl, and fluorinated and perfluorinated $C_7$ to $C_{24}$ aralkyl. The fluorinated and perfluorocarbyl ether substituents are represented by the formulae $-(CH_2)_m OR^{36'}$, or $-(CF_2)_m OR^{36'}$ respectively, where $R^{36'}$ is a fluorinated or perfluorocarbyl group as defined above, m is and integer of 0 to 5. It is to be noted that when m is 0 the oxygen atom in the ether moiety is directly bonded attached to the boron atom in the boratobenzene ring.

Advantageous $R^{34'}$ radicals include those that are electron withdrawing in nature such as, for example, fluorinated and perfluorinated hydrocarbyl radicals selected from trifluoromethyl, perfluoroethyl, perfluoropropyl, perfluoroisopropyl, pentafluorophenyl and bis(3,5-trifluoromethyl)phenyl.

$R^{35'}$ independently represents hydrogen, halogen, perfluorocarbyl, and silylperfluorocarbyl radicals, where the perfluorocarbyl and silylperfluorocarbyl are as defined previously. While the halogen groups can be any appropriate halogen, generally chlorine or fluorine are selected. When $R^{35'}$ is halogen, perfluorocarbyl, and/or silylperfluorocarbyl, the radical(s) are generally ortho or para to the boron atom in the boratobenzene ring.

Additional representative boratobenzene anions include but are not limited to [1,4-dihydro-4-methyl-1-(pentafluorophenyl)]-2-borate, 4-(1,1-dimethyl)-1,2-dihydro-1-(pentafluorophenyl)-2-borate, 1-fluoro-1,2-dihydro-4-(pentafluorophenyl)-2-borate, and 1-[3,5-bis(trifluoromethyl)phenyl]-1,2-dihydro-4-(pentafluorophenyl)-2-borate.

Carborane and halocarborane anions useful as the weakly coordinating counteranion include but are not limited to $CB_{11}(CH_3)_{12}$—, $CB_{11}H_{12}$—, $1-C_2H_5CB_{11}H_{11}$—, $1-Ph_3SiCB_{11}H_{11}$—, $1-CF_3CB_{11}H_{11}$—, $12-BrCB_{11}H_{11}$—, $12-BrCB_{11}H_{11}$—, $7,12-Br_2CB_{11}H_{10}$—, $12-ClCB_{11}H_{11}$—, $7,12-Cl_2CB_{11}H_{10}$—, $1-H-CB_{11}F_{11}$—, $1-CH_3-CB_{11}F_{11}$—, $1-CF_3-CB_{11}F_{11}$—, $12-CB_{11}H_{11}F$—, $7,12-CB_{11}H_{11}F_{12}$—, $7,9,12-CB_{11}H_{11}F_3$—, $CB_{11}H_6\ Br_6$—, $6-CB_9H_9F$—, $6,8-CB_9H_8F_2$—, $6,7,8-CB_9H_7F_3$—, $6,7,8,9-CB_9H_6F_4$—, $2,6,7,8,9-CB_9H_5F_5$—, $CB_9H_5Br_5$—, $CB_{11}H_6Cl_6$—, $CB_{11}H_6F_6$—, $CB_{11}H_6F_6$—, $CB_{11}H_6I_6$—, $CB_{11}H_6\ Br_6$—, $6,7,9,10,11,12-CB_{11}H_6F_6$—, $2,6,7,8,9,10-CB_9H_5F_5$—, $1-H-CB_9F_9$—, $12-CB_{11}H_{11}(C_6H_5)$—, $1-C_6F_5-CB_{11}H_5Br_6$—, $CB_{11}Me_{12}$—, $CB_{11}(CF_3)_{12}$—, $Co(B_9C_2H_{11})_2$—, $CB_{11}(CH_3)_{12}$—, $CB_{11}(C_4H_9)_{12}$—, $CB_{11}(C_6H_{13})_{12}$—, $Co(C_2B_9H_{11})_2$—, $Co(Br_3C_2B_9H_8)_2$— and dodecahydro-1-carbadodecaborate.

Still other useful anions can also be selected from highly fluorinated and perfluorinated alkylsulfonyl and arylsulfonyl containing anions represented by the formulae $(R^{40}SO_2)_2CH$—, $(R^{40}SO_2)_3C$— and $(R^{40}SO_2)_2N$—, where $R^{40}$ independently represents a linear and branched $C_1$ to $C_{20}$ highly fluorinated or perfluorinated alkyl, a $C_5$ to $C_{15}$ highly fluorinated or perfluorinated cycloalkyl and a $C_6$ to $C_{22}$ highly fluorinated or perfluorinated aryl. Optionally, the above alkyl and cycloalkyl groups can contain one or more heteroatoms such as divalent oxygen, trivalent nitrogen and hexavalent sulfur. Further, any two of $R^{40}$ can be taken together within a cyclic structure. Still further, generally, the aforementioned highly fluorinated groups have at least half of the hydrogens replaced with fluorines and typically at least 2 of every 3, and in some embodiments, 3 of every 4 hydrogens are replaced with fluorines. In some highly fluorinated embodiments, some or all of the remaining hydrogens are replaced with either bromines or chlorines.

Some representative highly fluorinated and perfluorinated alkylsulfonyl and arylsulfonyl containing groups are disclosed in U.S. Pat. No. 6,455,650, entitled "Catalyst and Methods for Polymerizing Cyclicolefins", to Lipian et al., at column 25, lines 17 to 49, inclusive, which is incorporated herein by reference.

Advantageous exemplary salts of weakly coordinating anions are N,N-dimethylanilinium tetrakis(pentafluorophenyl)borate (DANFABA) and lithium tetrakis(pentafluorophenyl)borate 2.5 diethyletherate (LiFABA), and N,N-dimethylanilinium tris((trifluoro methyl)sulfonyl)methide among others.

Exemplary embodiments in accordance with the present invention utilize one or more non-phosphorus containing catalysts selected from palladium(II) acetate—[Pd(OAc)$_2$], palladium(II) acetylacetonate—[Pd(acac)$_2$], palladium(II) hexafluoroacetylacetonate—[Pd(CF$_3$COCHCOCF$_3$)$_2$], palladium(II) bis(tetramethylheptanedionato), palladium(II) bis(benzoylacetonato), (allyl)palladium(II) bis(acetonitrile)tris((trifluoro methyl)sulfonyl)methide, (allyl)palladium(II) bis(acetonitrile)tetrakis(pentafluorophenyl)borate, (acac)palladium(II) bis(acetonitrile)tetrakis(pentafluorophenyl)borate and (t-buacac)palladium(II) di(t-butylamine)tetrakis(pentafluorophenyl)borate.

In some embodiments in accordance with the present invention, the CTAA is an acid such as formic acid, thioformic acid or another such compound. An exemplary embodiment of the CTAA is formic acid. In an embodiment, a reaction mixture according to the present invention comprises an amount of CTAA that is from 1 to 25% by moles of the total monomer loading to the reaction mixture.

In some embodiments of the present invention, a mixture including a monomer composition, the CTAA and a palladium catalyst is exposed to a temperature at which the above-described catalysts can effect polymerization of the monomers. In some embodiments the temperature is from an ambient temperature to 250° C. For some exemplary embodiments, the aforementioned mixture is heated to a temperature of at least 30° C., in some cases of at least 70° C. and, in other cases, at least 150° C.

The following examples are provided for illustrative purposes only and are not intended to limit the invention in any way. The ratios of monomers recited in the title of such experiments represent the molar feed ratio of such monomers in the reaction mixture and is generally found to be representative of the final composition of repeating units in the polymer. Further, for each experiment a general procedure for forming the specific polymer is provided followed by a table representing the results of two or more repetitions of such procedure where the mole percent of the CTAA was varied to demonstrate the effect of such a change on the molecular weight and/or conversion rate of the resultant polymer. In all cases this mole percent is based on the amount of monomer present in the particular experimental description and is presented in the accompanying tables as "% Formic Acid". In some experiments more than one table is shown to illustrate the effect of the varying amounts CTAA for the polymerization of specific monomers with alternate catalysts. However, to facilitate the comparison of the various results presented hereinbelow, formic acid was employed as the CTAA for each of the experiments presented.

In the presentation of such experimental data, abbreviations are used to simplify the naming of monomers and catalysts. The following listing of those abbreviations provides an appropriate name for each of such abbreviations:

| MONOMERS | |
|---|---|
| HFANB | 5-(2-hydroxy-2,2-bistrifluoromethylethyl)-2-norbornene |
| TFSNB | N-(bicyclo [2.2.1]hept-5-en-2-ylmethyl)-1,1,1-trifluoromethanesulfonamide |
| FPCNB | pentafluoroester of 5-norbornene-2-carboxylic acid |
| MeOAcNB | 2-hydroxymethyl-5-norbornene acetate |
| PhOAcNB | 2-(4-acetoxyphenyl)-5-norbornene |
| t-BuEsNB | t-butylester of 5-norbornene-2-caboxylic acid |

| MONOMERS | |
|---|---|
| MCPNB | 1-methylcyclopentyl-5-norbornene |
| NB | norbornene; |
| TFENB | bicyclo[2.2.1]hept-5-ene-2-carboxylic acid tetrahydro-2-oxo-3-furanyl ester; |
| TESNB | 2-triethoxylsilyl-5-norbornene; |
| AGENB | 2-methyl glycidyl ther-5-norbornene; |

| MONOMERS | |
|---|---|
| Acid NB | bicyclo[2.2.1]hept-5-ene-2-carboxylic acid; |
| DecNB | 5-decyl-2-norbornene; |
| PENB | 5-Phenylethyl-2-norbornene; |
| BuNB | 5-butyl-2-norbornene; |
| $NBC_2H_4CO_2Et$ | ethyl-5-norbornenepropionate; |

| CO-CATALYSTS AND CATALYSTS | |
|---|---|
| DANFABA | dimethylanilinium tetrakis (pentafluorophenyl) borate |
| LiFABA | Li tetrakis(pentafluorophenyl)borate etherate |
| Pd-641 | (allyl)palladium(II) bis(acetonitrile)tris((trifluoro methyl)sulfonyl)methide; |
| Pd-910 | (allyl)palladium(II) bis(acetonitrile)tetrakis(pentafluorophenyl)borate; |
| Pd-304 | palladium(II) acetylacetonate; |
| Pd-444 | tetra(acetonitrile)palladium(II)tetrafluoroborate$_2$; |
| Pd-916 | $Pd_2(dba)_3$ |
| Pd-917 | [(1,4-benzoquinone)(norbornene)palladium(0)] dimer |
| Pd-967 | (acac)palladium(II)bis(acetonitrile)tetrakis(pentafluorophenyl)borate] |
| Pd-1115 | (t-buacac)palladium(II) di(t-butylamine)tetrakis (pentafluorophenyl)borate]. |
| Pd-1206 | (acetonitrile)bis(triisopropylphosphine)palladium(acetate) FABA |
| Pd-1394 | (acetonitrile)bis(t-butyldicyclohexylphosphine)palladium(acetate) FABA |
| Pd-1627 | (acetonitrile)bis(tri-octylphosphine)palladium(acetate) FABA |
| Pd-1731 | (acetonitrile)bis(eicosyl phobane phosphine)palladium(acetate) FABA |
| Pd-1296 | (acetonitrile)(tri-octylphosphine)palladium(acetylacetonate) FABA |
| Pd-1348 | (acetonitrile)(eicosyl phobane phosphine)palladium(acetylacetonate) FABA |

EXAMPLES

Examples 1-12 are illustrative of polymerizations that employ a phosphorus containing catalyst in accordance with Formulae Ia or Ib. In examples 1 and 2 the activation effect of a CTAA such as formic acid is demonstrated. That is to say that such examples show that by increasing the amount of such a CTAA, the percent conversion of the monomers, charged to the reaction vessel, into a polymer increases. Examples 10-12 are illustrative of the effect that a CTAA such as formic acid has on both the molecular weight Mw of the resultant polymer and the percent conversion. Examples 3-8 are illustrative of the effect that formic acid has on the molecular weight (Mw) of polymers that are obtained from the polymerization of various norbornene-type polymers using phosphorus containing catalyst when conversions are at or near 100 percent.

Catalyst Examples 1-7 are illustrative of methods of forming non-phosphorus containing catalysts that are in accordance with Catalyst Formulae II or III; and Examples 13-42 are illustrative of polymerizations that employ such non-phosphorus containing catalysts. Comparative Examples 1 and 2 demonstrate that a CTAA such as formic acid has essentially no effect in controlling the molecular weight of polymers made using the non-phosphorous containing catalyst tetra(acetonitrile)palladium(II)tetrafluoroborate$_2$ (Pd-444).

Common to all examples is that the reagents used are essentially oxygen free. That is to say that, either the reagents and solvents mentioned are charged into a reaction vessel and then sparged with nitrogen for a period of time believed sufficient to remove essentially all dissolved oxygen, or such reagents and solvents are individually sparged prior to their use and stored under a nitrogen blanket until they are charged to the reaction vessel. Therefore it will be understood that while a specific experimental description will not refer to either of the above methods of providing oxygen free reagents and solvents, one or the other was employed. Further, while not specifically mentioned in any specific example, an appropriate method of stirring or otherwise agitating the contents of a reaction vessel was provided.

In addition, molecular weight (Mw) was determined by gel permeation chromatography (GPC) using poly(styrene) standards. The percent (%) conversion of the monomers to polymer was determined gravimetrically using a total solids analyzer (Mettler Toledo HR73 halogen moisture analyzer) or by using well known GPC methods.

The optical density (OD) of the polymers, where provided, was determined by the following method: (1) a 20 weight percent solution of the desired polymer was formed using propylene glycol methyl ether acetate (PGMEA); (2) the solution was dispensed onto a 1-inch quartz wafer and spun at 500 rpm for 15 sec and then 2000 rpm for 60 sec; (3) after the wafers were baked for 120 sec at 130° C., the optical absorbance was measured at 193 nm using a Cary 400 Scan UV-Vis spectrophotometer; (4) the thickness of the films was measured using a TENCOR Profilometer after the films were scored and the optical density (OD) of the film calculated by dividing the absorbance by the thickness (in microns).

Samples for MALDI-TOF MS were prepared in the following manner: (1) THF solutions of a polymer sample (0.1 mg/mL) and dithranol (1,8,9-anthracenetriol, 0.2 mg/mL) were prepared; (2) sodium trifluoroacetate was dissolved in methanol (0.3 mg/mL), and 30 μL of such solution was added to 1 mL of the polymer sample solution; (3) equal volumes (30 μL each) of the sample/sodium trifluoroacetate and dithranol solutions were mixed together; and (4) 1 μL of such mixture deposited via syringe onto a stainless steel MALDI plate and allowed to dry. The instrument used was a Bruker Reflex III MALDI-TOF-MS, operated in either linear or reflectron mode with delayed ion extraction.

Example 1

Polymerization of TFSNB/FPCNB (75/25)

An appropriate sized reaction vessel was charged with TFSNB, 77.0 g (302 mmol), FPCNB, 27.0 g (100 mmol), 116.5 g toluene and 38.8 g ethyl acetate. The vessel was sealed and transferred to a dry box. Pd-1206 (0.035 g, 0.027 mmol) and DANFABA (0.066 g, 0.082 mmol) were added to the reaction vessel, the contents mixed and 40.0 g portions of this solution was transferred to a second appropriate size vessel, sealed and taken out of the dry box. The desired amount of formic acid was added and the solution was heated to 100° C. and stirred for 17 hours. The reaction mixture was then allowed to cool to room temperature and analysis (for molecular weight and conversion) were performed.

TABLE 1

| Example | % Formic Acid | Conversion | Mw | Mw/Mn |
|---|---|---|---|---|
| 1a | 0% | 34.4% | 93478 | 2.48 |
| 1b | 2% | 86.6% | 11009 | 1.81 |
| 1c | 4% | 90.2% | 7571 | 1.72 |

Example 2

Polymerization of MCPNB/TFENB/TFSNB (40/30/30)

An appropriate sized reaction vessel was charged with 4.40 g (20.0 mmol) MCPNB, 3.36 g (15.0 mmol) TFENB, 3.83 g (15.0 mmol) TFSNB, 12.9 g toluene, 4.32 g ethyl acetate and a stir bar. This solution was sealed and transferred to a dry box. LIFABA (0.065 g (0.075 mmol)) and Pd-1394 (0.035 g (0.025 mmol)) were added, sealed and the vessel was taken out of the dry box. The desired amount of formic acid was added and the solution was heated to 90° C. and stirred for 17 hours. The reaction mixture was then allowed to cool to room temperature and analysis (for molecular weight and conversion) were performed.

TABLE 2

| Example | % Formic Acid | Conversion | MW | Mw/Mn |
|---|---|---|---|---|
| 2a | 0% | 47% | 65169 | 2.72 |
| 2b | 4% | 54% | 6710 | 3.03 |
| 2c | 8% | 90% | 3523 | 2.16 |
| 2d | 12% | 82% | 2224 | 1.69 |

Example 3

Polymerization of HFANB/t-BuEsNB (80/20)

An appropriate sized reaction vessel was charged with 10.9 g (40.0 mmol) HFANB, 1.94 g (10.0 mmol) t-BuEsNB, 14.4 g toluene, 4.81 g ethyl acetate and stirred. This solution was sealed and transferred to a dry box. DANFABA (0.060 g (0.075 mmol)) and Pd-1206 (0.030 g (0.025 mmol)) were added, sealed and the vessel was taken out of the dry box. The desired amount of formic acid was added and the solution was heated to 100° C. and stirred for 16 hours. The reaction mixture was then allowed to cool to room temperature and analysis (for molecular weight and conversion) were performed.

TABLE 3

| Example | % Formic Acid | Conversion | MW | Mw/Mn |
|---|---|---|---|---|
| 3a | 0% | 97% | 94196 | 2.86 |
| 3b | 8% | 99% | 7683 | 1.97 |
| 3c | 12% | 99% | 5063 | 1.86 |
| 3d | 16% | 99% | 6033 | 1.91 |

Example 4

Polymerization of TFSNB/FPCNB (80/20)

An appropriate sized reaction vessel was charged with 8.16 g (32.0 mmol) TFSNB, 2.16 g (8.00 mmol) FPCNB, 12.0 g toluene, 4.0 g ethyl acetate and a stir bar. This solution was sealed and transferred to a dry box. Pd-1206 (0.024 g, 0.020 mmol) and DANFABA (0.048 g, 0.060 mmol) were added to the vessel, capped and taken out of the dry box. The desired amount of formic acid was added. The solution was heated to 100° C. and stirred for 16 hours. The reaction mixture was then allowed to cool to room temperature, diluted with 2 g of THF (10 g of THF for example 4a) and an analysis for molecular weight and % conversion were performed.

TABLE 4

| Example | % Formic Acid | Conversion | Mw | Mw/Mn |
|---|---|---|---|---|
| 4a | 0% | 98% | 73100 | 4.18 |
| 4b | 3% | 97% | 11020 | 1.79 |
| 4c | 5% | 98% | 7360 | 1.65 |
| 4d | 7% | 99% | 4510 | 1.48 |
| 4e | 9% | >97% | 4170 | 1.45 |
| 4f | 11% | >97% | 3860 | 1.49 |
| 4g | 13% | >97% | 3470 | 1.46 |
| 4h | 15% | >97% | 3290 | 1.44 |

Example 5

Polymerization of TFSNB/FPCNB (75/25)

An appropriate sized reaction vessel was charged with 7.66 g (30.0 mmol) TFSNB, 2.70 g (10.0 mmol) FPCNB, 12.0 g toluene, 4.0 g ethyl acetate and a stir bar. This solution was sealed and transferred to a dry box. Pd-1206 (0.048 g, 0.040 mmol) and DANFABA (0.096 g, 0.12 mmol) were added to the vessel, capped and taken out of the dry box. The desired amount of formic acid was added. The solution was heated to 100° C. and stirred for 16 hours. The reaction mixture was then allowed to cool to room temperature and an analysis for molecular weight and conversion were performed.

TABLE 5

| Example | % Formic Acid | Conversion | Mw | Mw/Mn |
|---|---|---|---|---|
| 5a | 7% | >95% | 4520 | 1.48 |
| 5b | 9% | >95% | 4180 | 1.47 |
| 5c | 11% | >95% | 3620 | 1.49 |
| 5d | 13% | >95% | 3220 | 1.43 |

Example 6

Polymerization of TFSNB/FPCNB/HFANB (60/20/20)

In an appropriate sized reaction vessel, TFSNB (18.4 g, 0.072 mmol), FPCNB (6.48 g, 0.024 mmol), HFANB (6.58 g, 0.0240 mmol), DANFABA (0.144 g, 0.00018 mmol) were mixed with toluene (40 mL) and ethyl acetate (9 ml) and added to a reaction vessel. The desired amount of formic acid (see table for details) were added. The vessel was sealed and then heated to 100 C. The catalyst, Pd-1206 (0.072 g, 0.000060 mmol), in ethyl acetate (3.9 ml) was added to the vessel. The mixture was stirred for 16 hours. The reaction mixture was then cooled and subjected to total solids analysis (for conversion) and GPC analysis (for molecular weight).

TABLE 6

| Example | % Formic Acid | Conversion | Mw | Mw/Mn |
|---|---|---|---|---|
| 6a | 9% | 100% | 4100 | 1.51 |
| 6b | 11% | 100% | 3460 | 1.50 |
| 6c | 15% | 100% | 3120 | 1.46 |

Example 7

Polymerization of TFSNB/FPCNB/HFANB (20/20/60)

An appropriate sized reaction vessel, TFSNB (6.13 g, 0.024 mmol), FPCNB (6.48 g, 0.024 mmol), HFANB (19.7 g, 0.072 mmol), and DANFABA (0.144 g, 0.00018 mmol) were mixed with toluene (42 mL) and ethyl acetate (9 ml) and added to the vessel. The desired amount of formic acid (see table for details) was added. The vessel was sealed and then heated to 100 C. The catalyst, Pd-1206 (0.072 g, 0.000060 mmol), in ethyl acetate (3.9 ml) was added to the vessel. The mixture was stirred for 17 hours. The reaction mixture was then cooled and subjected to total solids analysis (for conversion) and GPC analysis (for molecular weight).

TABLE 7

| Example | % Formic Acid | Conversion | Mw | Mw/Mn |
|---|---|---|---|---|
| 7a | 9% | 100% | 5580 | 1.79 |
| 7b | 11% | 100% | 5370 | 1.89 |
| 7c | 20% | 100% | 3980 | 1.70 |

Example 8

Polymerization of 25/75 PhOAcNB/MeOAcNB

An appropriate sized reaction vessel, PhOAcNB (6.85 g, 0.030 mmol), MeOAcNB (15.0 g, 0.090 mmol), DANFABA (0.029 g, 0.000036 mol) and toluene (29 mL) were mixed and added to the vessel. The desired amount of formic acid (see table for details) were added. The vessel was sealed and then heated to 100 C. The catalyst, Pd-1206 (0.014 g, 0.000012 mol), in ethyl acetate (6.4 ml) was added to the reactor. The mixture was stirred for 18 hours. The reaction mixture was then cooled and subjected to total solids analysis (for conversion) and GPC analysis (for molecular weight).

TABLE 8

| Example | % Formic Acid | Conversion | Mw | Mw/Mn |
|---|---|---|---|---|
| 8a | 30% | 100% | 5070 | 2.83 |
| 8b | 40% | 100% | 3700 | 2.42 |

Example 9

Polymerization of MeOAcNB

An appropriate sized reaction vessel, MeOAcNB (23.3 g, 0.14 mmol), DANFABA (0.034 g, 0.000042 mmol) were mixed with toluene (31 mL) and added to the vessel. The desired amount of formic acid (see table for details) was added. The reactor was sealed and then heated to 100 C. The catalyst, Pd-1206 (0.017 g, 0.000014 mmol), in ethyl acetate (6.2 ml) was added to the vessel. The mixture was stirred for 18 hours. The reaction mixture was then cooled and subjected to total solids analysis (for conversion), GPC analysis (for molecular weight) and MALDI-TOF MS analysis (for end-group identification).

TABLE 9

| Ex # | % Formic Acid | Conversion | Mw | Mw/Mn | MALDI-TOF MS Result |
|---|---|---|---|---|---|
| 9a | 30% DCOOH | 100% | 8220 | 3.46 | D-(MeOAcNB)n-H |
| 9b | 30% HCOOD | 100% | 3460 | 2.31 | H-(MeOAcNB)n-D |
| 9c | 30% DCOOD | 100% | 8410 | 2.83 | D-(MeOAcNB)n-D |
| 9d | 30% HCOOH | 100% | 4090 | 2.51 | H-(MeOAcNB)n-H |

Example 10

Polymerization of TFSNB/FPCNB/HFANB (60/20/20)

The following process was used for all examples presented in Table 10 except that the results for 10j, 10k and 10m were obtained from a polymerization conducted at 110° C.

An appropriated sized reaction vessel was charged with 7.66 g (36.0 mmol) of TFSNB, 3.24 g (12.0 mmol) of FPCNB, 3.29 g (12.0 mmol) of HFANB, DANFABA (0.072 g, 0.090 mmol), 15.1 g toluene and 5.83 g ethyl acetate. (0.030 mmol) of the catalyst indicated in Table 10 and toluene (2.39 g) were added to a separate vessel. The desired amount of formic acid (indicated in Table 10) was added to the monomer solution in the reaction vessel and such solution was heated to 100° C. The catalyst from the separate vessel was added to the monomer solution by syringe and allowed to react, with stirring, for about 16 hours. After cooling, a GPC analysis (for molecular weight) and total solid measurement (for conversion) were performed.

TABLE 10

| Example | Catalyst | % FA | Conv (TS) | Mw | Mw/Mn | OD |
|---|---|---|---|---|---|---|
| 10a | Pd-1627 | 5 | 98 | 3644 | 1.49 | 0.49 |
| 10b | " | 10 | 100 | 2679 | 1.41 | |
| 10c | " | 15 | 94 | 2481 | 1.38 | |
| 10d | Pd-1731 | 5 | 89 | 4595 | 1.51 | 0.24 |
| 10e | " | 10 | 96 | 2993 | 1.43 | 0.22 |
| 10f | " | 15 | 90 | 2789 | 1.43 | |
| 10g | " | 3 | 99 | 5440 | 1.59 | |
| 10h | " | 5 | 100 | 4150 | 1.50 | |
| 10i | " | 7 | 100 | 3240 | 1.42 | |
| 10j | " | 3 | 99 | 5440 | 1.59 | |
| 10k | " | 5 | 100 | 4150 | 1.50 | |
| 10m | " | 7 | 100 | 3240 | 1.42 | |

Example 11

Polymerization of TFSNB/FPCNB (75/25)

The following general process was used to form the polymers of Tables 11A and 11B. For the polymers of Table 11A the catalyst employed and the percent CTAA were varied, while for the polymers in Table 11B, only the catalyst Pd-1627 was used, but at different monomer to catalyst ratios, different temperatures and different reaction solvents, as shown in such table.

An appropriate sized reaction vessel was charged with TFSNB 11.49 g (45.0 mmol), FPCNB 4.05 g (15.0 mmol), DANFABA 0.072 g (0.090 mmol) and dissolved in an appropriate amount of either toluene/ethyl acetate of trifluorotoluene/ethyl acetate (75/25 mol %) such that the monomer charge in the vessel was about 40 wt % of the total charge. 0.030 mmol of the catalyst indicated in Table 11, below, was added to a separate vessel with toluene (3.85 g). The desired amount of formic acid was added to the monomer solution in the reaction vessel and the solution was heated to 100° C. for the experiments of Table 11A and the temperature indicated for those shown in Table 11B. The catalyst from the separate vessel was added to the monomer solution by syringe and in allowed to react, with stirring, for about 16 hours. After cooling, a GPC analysis (for molecular weight) and total solid measurement (for conversion) were performed.

TABLE 11A

| Ex # | Catalyst | % FA | Conversion | Mw | Mw/Mn | OD |
|---|---|---|---|---|---|---|
| 11a | Pd-1296 | 9 | 90% | 7643 | 2.13 | |
| 11b | " | 7 | 91% | 8074 | 2.10 | |
| 11c | Pd-1348 | 9 | 76% | 8820 | 2.10 | |
| 11d | " | 7 | 77% | 9744 | 2.12 | |
| 11e | Pd-1627 | 5 | 92% | 3635 | 1.47 | 0.42 |
| 11f | " | 9 | 97% | 2843 | 1.41 | |

TABLE 11A-continued

| Ex # | Catalyst | % FA | Conversion | Mw | Mw/Mn | OD |
|---|---|---|---|---|---|---|
| 11g | | 15 | 97% | 2274 | 1.34 | |
| 11h | Pd-1731 | 5 | 87% | 4536 | 1.52 | |
| 11i | " | 9 | 92% | 3189 | 1.42 | 0.22 |
| 11j | | 15 | 100% | 2486 | 1.39 | |

TABLE 11B

| Ex # | Mon:Cat | Temp | Solvent | % FA | Conv (TS) | Mw | Mw/Mn |
|---|---|---|---|---|---|---|---|
| 11k | 1500:1:3 | 80 | 75/25 | 5 | 62 | | |
| 11m | " | " | Tol/EA | 10 | 56 | | |
| 11n | " | " | | 15 | 54 | | |
| 11o | 1000:1:3 | 80 | 75/25 | 5 | 74 | | |
| 11p | " | | Tol/EA | 10 | 74 | | |
| 11q | " | | | 15 | 71 | | |
| 11r | 2000:1:3 | 100 | 75/25 | 5 | 97 | 3451 | 1.51 |
| 11s | " | " | TFT/EA | 10 | 97 | 2718 | 1.42 |
| 11t | " | " | | 15 | 98 | 2314 | 1.39 |

Example 12

Polymerization of HFANB/MeOAcNB (55/45)

The following process is used for all examples in Table 12 except that Pd-1731 was used for Experiments 12a through 12f and Pd-1627 was used for Experiments 12g through 12i.

An appropriate sized reaction vessel was charged with 9.05 g (33.0 mmol) of HFANB, 4.49 g (27.0 mmol) of MeOACNB, (0.072 g, 0.090 mmol) of DANFABA, 12.2 g toluene and 4.97 g ethyl acetate. An appropriate amount of the appropriate catalyst (0.030 mmol of the catalyst with the amount of monomer indicated above represents a 5000:1 monomer to catalyst ratio) and toluene (2.39 g) were added to a separate vessel. The desired amount of formic acid was added to the monomer solution. The catalyst from the separate vessel was added to the monomer solution by syringe and in allowed to react, with stirring, for from about 16 to 18 hours. After cooling, a GPC analysis (for molecular weight) and total solid measurement (for conversion) were performed.

TABLE 12

| Ex # | Mon:Cat | % FA | Conversion | Mw | Mw/Mn | OD |
|---|---|---|---|---|---|---|
| 12a | 2000:1:3 | 5 | 100% | 6046 | 2.31 | |
| 12b | " | 10 | 100% | 4607 | 2.23 | |
| 12c | " | 15 | 100% | 3993 | 2.11 | 0.27 |
| 12d | 5000:1:3 | 15 | 73% | | | |
| 12e | 10k:1:3 | " | 39% | | | |
| 12f | 20k:1:3 | " | 16% | | | |
| 12g | 5k:1:3 | 15 | 57% | | | |
| 12h | 10k:1:3 | " | 27% | | | |
| 12i | 20k:1:3 | " | 13% | | | |

Catalyst Examples 1-6 illustrate the formation of some catalysts useful in embodiments of the present invention.

Catalyst Example 1a Pd-910

A solution of (allyl)palladium(II) chloride dimer (2.21 g, 6.05 mmol) dissolved in 22 mL $CH_2Cl_2$ and 12, mL MeCN was added to a solution of silver tetrakis(pentafluorophenyl) borate (11.74 g, 12.09 mmol), 1.5 mL toluene dissolved in 22 mL $CH_2Cl_2$. An immediate white precipitate formed. The solution was stirred for 20 minutes, at which point it was filtered through Celite® and concentrated under vacuum to form a light yellow oil. The oil was shaken with n-pentane (2×20 mL) and dried in vacuo to produce a light yellow solid. Yield: 10.2 g (93%). $^1$H NMR (CD$_2$Cl$_2$, 500 MHz): δ 2.28 (s, 6H), 3.19 (d, 2H), 4.33 (d, 2H), 5.65 (sept, 1H).

Catalyst Example 1b

Pd-910

To a yellow solution of (allyl)palladium(II) chloride dimer (0.402 g, 1.10 mmol) and LiFABA.2.5 Et$_2$O (1.92 g, 2.20 mmol) dissolved in 30 mL CH$_2$Cl$_2$ was added a colorless solution of silver trifluoroacetate (0.486 g, 2.20 mmol) dissolved in 5 mL MeCN. A white precipitate forms immediately. The solution is stirred for 1 h at which point it is filtered through Celite® and concentrated under vacuum to a light yellow oil. The oil is shaken with 2×20 mL n-pentane and dried in vacuo for 30 min. to produce a white solid. 1.60 g yield (80% yield). $^1$H NMR (CD$_2$Cl$_2$, 500 MHz): δ 2.24 (s, 6H), 3.18 (d, 2H), 4.33 (d, 2H), 5.65 (sept, 1H). $^{19}$F NMR (CD$_2$Cl$_2$, 470 MHz): δ −133.9, −164.3, −168.0.

Catalyst Example 2

Pd-641

A solution of (allyl)palladium(II) chloride dimer (2.50 g, 6.82 mmol) dissolved in 10 mL CH$_2$Cl$_2$ and 10 mL MeCN was added to a solution of silver tris(trifluoromethylsulfonyl) methide (6.26 g, 13.6 mmol) (see Inorg. Chem. 1988, 27, 2135) dissolved in 20 mL MeCN. An immediate white precipitate formed. The solution was stirred for 90 minutes, at which point it was filtered through Celite® and concentrated under vacuum to form an oily solid. The oily solid was washed with 10 mL ether followed by 20 mL n-pentane and place in −5° C. freezer for 16 hrs. The solids were collected and dry in vacuo to produce a light yellow solid. Yield 5.58 g (70%). $^1$H NMR (CD$_2$Cl$_2$, 500 MHz): δ 2.23 (s, 6H), 3.19 (d, 2H), 4.31 (s, 2H), 5.65 (s, 1H). $^{19}$F NMR (CD$_2$Cl$_2$, 500 MHz): δ −78.5.

Catalyst Example 3

[Dimethylanilinium][Tris(trifluoromethylsulfonyl) methide]

In an appropriate sized reaction vessel, 10.00 g of a 59.1 wt % solution of (CF$_3$SO$_3$)CH in water was added. 4 mL ether was added to the vessel followed by a drop-wise addition of a solution of dimethylaniline (1.82 mL, 14.34 mmol) dissolved in 10 mL ether over the course of 5 min. The solution was stirred for 20 minutes and the layers were separated. The aqueous layer was collected and washed with ether (2×10 mL). The ether washing were combined and the solvent was removed in vacuo to produce a colorless solid. Yield 7.66 g (100%). $_1$H NMR (CD$_2$Cl$_2$, 500 MHz): δ 3.32 (s, 6H, (CH$_3$)$_2$ NHC$_6$H$_5$), 7.51-7.64 (m, 5H, (CH$_3$)$_2$NHC$_6$H$_5$). $_{19}$F NMR (CD$_2$Cl$_2$, 500 MHz): δ −77.2.

Catalyst Example 4

Lithium [tris(trifluoromethylsulfonyl)methide]

In an appropriate sized reaction vessel, 10.00 g of a 59.1 wt % solution of (CF$_3$SO$_3$)CH in water was added. Solid lithium hydroxide (0.403 g, 16.81 mmol) was added portion wise, and the solution was stirred for 10 minutes as the temperature rose to 50° C. and returned to room temp. The solution was filtered and concentrated to dryness to produce a white solid. Yield 6.08 g (100%). $^{19}$F NMR (CD$_2$Cl$_2$, 500 MHz): δ −77.1.

Catalyst Example 5

Pd-967

To a yellow suspension of Pd-304 (7.56 g, 24.8 mmol) in 480 mL of a 1:1 mixture of THF/MeCN was added a brown solution of LiFABA (21.6 g, 24.8 mmol) dissolved in 100 mL MeCN. The mixture is stirred overnight at which point it is filtered through Celite® and alumina filtering aid and concentrated under vacuum to a brown/orange solid. Yield: 22.70 g (94%). $^1$H NMR (CD$_2$Cl$_2$, 500 MHz): δ 2.02 (s, 6H), 2.06 (s, 6H), 5.54 (s, 1H). $^{19}$F NMR (CD$_2$Cl$_2$): δ −133.1, −163.5, −167.9.

Catalyst Example 6

Pd-1115

To an orange solution of palladium(II) di-t-butylacetylacetonate (1.06 g, 2.24 mmol) and LiFABA (1.96 g, 2.24 mmol) dissolved in 30 mL CH$_2$Cl$_2$ was added t-BuNH$_2$ (0.473 mL, 4.48 mmol). The solution became a yellow suspension over the course of 20 min. The mixture is stirred overnight at which point it is filtered through Celite® filtering aid and concentrated under vacuum to a yellow solid. Yield: 2.06 g (82%). $^1$H NMR (CD$_2$Cl$_2$, 500 MHz): δ 1.15 (s, 18H), 1.44 (s, 18H), 2.80 (s, 4H), 5.90 (s, 1H).

Catalyst Example 7

Pd-917

To a mixture of tris(dibenzylideneacetone)dipalladium (0) (2.97 g, 3.24 mmol), 1,4-benzoquinone (1.75 g, 16.2 mmol) and norbornene (3.05 g, 32.4 mmol) was added 100 mL acetone. The solution was stirred for 30 min at ambient temperature at which point the color changed from deep purple to reddish-brown. The solvent was concentrated in vacuo to ca. 20 mL and 150 mL ether was added to precipitate a brown solid. The solid was collected by cannula filtration, washed with 2×50 mL ether and dried in vacuo to produce a brown solid. Yield: 0.170 g (8.5%). $^1$H NMR (CDCl$_3$, 500 MHz): δ −0.25 (2H, d), 0.44 (2H, d), 1.21 (4H, m), 1.61 (4H, m), 2.95 (4H, s), 4.43 (4H, ddd), 4.78 (4H, s), 4.95 (4H, ddd).

Common to all examples that follow is that the reagents used are essentially oxygen free. That is to say that either the reagents and solvents are charged into a reaction vessel and then sparged with nitrogen for a period of time believed sufficient to remove essentially all dissolved oxygen, or the reagents and solvents are individually sparged prior to their use and stored under a nitrogen blanket prior to being charged to the reaction vessel. Therefore it will be understood that while a specific experimental description will not refer to either of the above methods of providing oxygen free reagents and solvents, one or the other was performed. Further, while not specifically mentioned in every example, an appropriate method of stirring or otherwise agitating the contents of a reaction vessel was provided.

Comparative Example 1

Polymerization of MeOAcNB using Pd-444

Nitrogen sparged MeOAcNB (9.97 g, 60.1 mmol) and toluene (14.96 g) were combined in a glass vial equipped with a stirbar. In a separate vial, Pd-444 (0.0265 g, 0.0600 mmol) was dissolved in nitromethane (4 mL) and ethylacetate (4 mL). To the catalyst solution was added P(n-Bu)$_3$ (0.0121 g, 0.0600 mmol). The monomer solution was heated to 110° C. and the catalyst solution was injected into the monomer solution. The reaction was allowed to stir at 110° C. for 21 hours. After cooling to room temperature, the polymerization conversion was determined by total solids measurement (49%). GPC: Mw=2760, Mn=1740. The polymer solution was filtered to remove black palladium metal and was evaporated to dryness then dissolved in a minimum of toluene. The toluene solution was poured into hexanes (4-5 times the polymer solution volume) to form a polymer precipitate. The precipitated polymer was filtered and dried under vacuum at 80° C. overnight. $^1$H NMR (CDCl$_3$): δ 0.5-2.7 (br m, aliphatic hydrogens), 3.5-4.5 (br m, —CH$_2$—OC(O)Me), 4.7-5.0 (br s, >C=CH$_2$, exo-cyclic olefinic end group hydrogens), 5.6-5.9 (br m, —CH=CH— endo-cyclic olefinic end group hydrogens). MALDI-TOF MS: the major series of (M+Na)+ ions was observed: m/z=1849, 2015, 2181, 2347, 2513, etc. The MALDI-TOF MS and 1H NMR data are consistent with the following diene end group structure, Formula X.

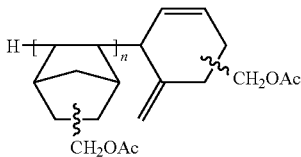

Comparative Example 2

Polymerization of 55/45 HFANB/MeOAcNB using Pd-444

In the glove box, MeOAcNB (4.49 g, 0.0270 mol), HFANB (9.05 g, 0.0330 mol), and toluene (13.6 g) were mixed in a vial equipped with a stirbar. The vial was sealed and brought out of the dry box. The appropriate amount of formic acid was added to the vial (see Table A below). The vial was heated to 90 C and Pd-444 (0.027 g, 0.0600 mmol) in nitromethane (1.31 g) was added. The reaction mixture was stirred at 90 C for 17 hours. The reaction mixture was then cooled and subjected to total solids analysis (for conversion) and GPC analysis (for molecular weight). The reaction mixtures were purified by removal of catalyst residues. The polymers were precipitated into hexanes and dried overnight in a vacuum oven at 60 C. The OD of the precipitated polymer was determined. The results shown in Table A show that the OD of the polymer does not change significantly as a function of Mw (and therefore a function of formic acid concentration). Samples 2a and 2d were subjected to MALDI-TOF MS analysis. The major series of (M+Na)+ ions observed were consistent with copolymers of HFANB and MeOAcNB with the diene end group structure shown in Formula VII. In the $^1$H NMR spectra of samples 2a through 2d, olefinic resonances are observed from 4.7 to 5.0 and 5.3 and 5.9 ppm consistent with the diene end group structure in Formula VII.

TABLE A

| Comparative Example | Conv % FA | Reaction Mixture (TS) | | | After precipitation | | |
|---|---|---|---|---|---|---|---|
| | | | Mw | Mw/Mn | Mw | Mw/Mn | OD (193) |
| 2a | 0 | 92 | 5140 | 1.69 | 5470 | 1.57 | 0.55 |
| 2b | 6 | 100 | 5140 | 1.71 | 5640 | 1.56 | 0.49 |
| 2c | 12 | 100 | 4970 | 1.69 | 5440 | 1.63 | 0.50 |
| 2d | 18 | 94 | 4830 | 1.69 | 5090 | 1.63 | 0.55 |

As it is readily seen in Table A, the addition of the formic acid CTAA to a Pd-444 catalyzed polymerization mixture seems to be ineffective for molecular weight control. As theorized previously, such a result suggests that Pd-444 is absent a moiety that can be replaced by the CTAA.

Example 13

Polymerization of MeOAcNB with Glacial HOAc and Formic Acid

In an appropriate sized reaction vessel, MeOAcNB, (9.97 g, 0.06 mmol) was mixed with (16 mL) toluene and added to the vessel and stirred. Glacial acetic acid, (0.07 g, 0.0012 mmol) and the desired amount of formic acid (see table for details) were added. The vessel was sealed and then heated to 110° C. The catalyst, Pd-641 (0.038 g, 0.000060 mmol) in toluene (1.7 ml) was added to the vessel. The mixture was stirred for 18 hours. The reaction mixture was then cooled and subjected to total solids analysis (for conversion) and GPC analysis (for molecular weight).

TABLE 13

| Ex # | Glacial HOAc (mol % on monomer) | % Formic Acid | % Conversion | Mw | Mw/Mn |
|---|---|---|---|---|---|
| 13a | 2% | 0% | 97% | 3020 | 1.67 |
| 13b | 2% | 10% | 91% | 2580 | 1.65 |

Example 14

Polymerization of MeOAcNB with Formic Acid

In an appropriate sized reaction vessel, MeOAcNB (41.6 g, 0.251 mmol), DANFABA (0.601 g, 0.00075 mmol) and toluene (66 mL) were mixed and added to the vessel. The desired amount of formic acid (see table for details) was added. The vessel was sealed and then heated to 110° C. The catalyst, Pd(acac)$_2$ (0.076 g, 0.00025 mol), in toluene (4.2 mL) was added to the vessel. The mixture was stirred for 16 hours. The reaction mixture was then cooled and subjected to total solids analysis (for conversion) and GPC analysis (for molecular weight).

TABLE 14

| Ex # | % Formic Acid | Conversion | Mw | Mw/Mn | OD (193 nm) |
|---|---|---|---|---|---|
| 14a | 0% | 99% | 5440 | 2.40 | 0.62 μ$^{-1}$ |
| 14b | 10% | 97% | 2130 | 1.65 | 0.48 μ$^{-1}$ |

The polymers resulting from Examples 14a and 14b were subjected to MALDI-TOF MS analysis. (The sample (0.1 mg/mL) and dithranol (1,8,9-anthracenetriol, 0.2 mg/mL) are dissolved in THF. Sodium trifluoroacetate is dissolved in methanol (0.3 mg/mL), and 30 μL of the sodium trifluoroacetate solution is added to 1 mL of the sample solution. Equal volumes (30 μL each) of the sample/sodium trifluoroacetate and dithranol solutions are mixed together, and 1 μL of this is deposited via syringe onto the stainless steel MALDI plate and allowed to dry. The instrument is a Bruker Reflex III MALDI-TOF-MS, operated in either linear or reflectron mode, with delayed ion extraction.)

For example 14a, the molecular ions observed for the major polymer series (~70%) was consistent with a di-olefinic end group. The $^1$H NMR spectrum of the polymer in example 14a exhibited two olefinic resonances from ~5.8 to ~5.5 ppm and at ~4.7 ppm. For example 14b, the molecular ions observed for major polymer series (~75%) was consistent with two hydrogen termini present in the polymer chain. The other polymer series (~25%) exhibited molecular ions consistent with a di-olefinic end group. The $^1$H NMR spectrum of the polymer in Example 14b exhibited the two olefinic resonances but at lower concentration when compared to the polymer from example 14a. The lower concentration of di-olefinic end groups in the polymer from Example 14b is consistent with the lower OD observed at 193 nm despite its lower molecular weight when compared to the polymer from Example 14a.

Example 15
Polymerization of PhOAcNB/BuNB/MeOAcNB (25/30/45)

In an appropriate sized reaction vessel, PhOAcCNB (3.42 g, 0.015 mmol), BuNB (2.70 g, 0.018 mmol), MeOAcNB (4.49 g, 0.027 mmol), DANFABA (0.144 g, 0.00018 mmol) were mixed with toluene (16 mL) and added to the vessel and stirred. The desired amount of formic acid (see table for details) was added. The vessel was sealed and then heated to 110 C. The catalyst, Pd(acac)2 (0.018 g, 0.000060 mmol), in toluene (2.1 ml) was added to the vessel. The mixture was stirred for 23 hours. The reaction mixture was then cooled and subjected to total solids analysis (for conversion) and GPC analysis (for molecular weight).

TABLE 15

| Ex # | % Formic Acid | Conversion | Mw | Mw/Mn |
|---|---|---|---|---|
| 15a | 0% | 100% | 8440 | 3.43 |
| 15b | 10% | 98% | 2820 | 1.95 |
| 15c | 15% | 99% | 2600 | 1.86 |

Example 16

Polymerization of PhOAcNB/BuNB/MeOAcNB (25/30/45)

An appropriate sized reaction vessel was charged with PhOAcNB (1.87 g, 8.75 mmol), BuNB (1.58 g, 10.5 mmol), MeOAcNB (2.62 g, 15.8 mmol), 5.84 g toluene and stirred. The vessel was sealed. The desired amount of formic acid was added and the solution was heated to 110° C., at which point a solution containing Pd-910 (0.032 g, 0.035 mmol), DAN-FABA (0.084 g, 0.105 mmol) dissolved in 3.64 mL toluene was added to the vessel, and the solution was stirred for 16 hours. The mixture was then allowed to cool to room temperature, and total solids analysis (for conversion) and GPC analysis (for molecular weight) were performed.

TABLE 16

| Ex # | % Formic Acid | Conversion | Mw | Mw/Mn |
|---|---|---|---|---|
| 16a | 0% | 96% | 6240 | 2.63 |
| 16b | 5% | 100% | 6260 | 2.67 |
| 16c | 10% | 100% | 6180 | 2.67 |
| 16d | 20% | 100% | 5710 | 2.50 |
| 16e | 30% | 100% | 5060 | 2.50 |
| 16f | 40% | 94% | 5020 | 2.42 |

Example 17

Polymerization of TFSNB/FPCNB (75/25)

An appropriate sized reaction vessel was charged with TFSNB (7.66 g, 30.0 mmol), FPCNB (2.70 g, 10.0 mmol), 12.0 g toluene, and 4.0 g ethyl acetate. The vessel was sealed and transferred to a dry box. Pd(acac)$_2$ (0.024 g, 0.079 mmol) and DANFABA (0.196 g, 0.25 mmol) were added, sealed and the vessel was taken out of the dry box. To the vessel in 17a, (0.048 g, 0.80 mmol) acetic acid was added. The desired amounts of formic acid were added to the vessels in 17b, 17c, and 17d and the solutions were heated to 120° C. and stirred for 16-20 hours. The reaction mixtures were then allowed to cool to room temperature, and GPC analysis (for molecular weight and conversion) was performed.

TABLE 17

| Ex # | % Formic Acid | Conversion | Mw | Mw/Mn |
|---|---|---|---|---|
| 17a | 0% | 84% | 3440 | 1.40 |
| 17b | 3% | 94% | 2780 | 1.33 |
| 17c | 6% | 94% | 2520 | 1.31 |
| 17d | 12% | 94% | 2240 | 1.27 |

Example 18

Polymerization of HFANB/TFSNB (80/20)

An appropriate sized reaction vessel in 6a was charged with HFANB (8.76 g, 32.0 mmol), TFSNB (2.04 g, 8.0 mmol), 12.0 g toluene, 4.0 g ethyl acetate and stirred. Another appropriate sized reaction vessel in 6b was charged with HFANB (17.53 g, 64.0 mmol), TFSNB (4.08 g, 16.0 mmol), 24.0 g toluene, 8.0 g ethyl acetate and stirred. These solutions were sealed and each transferred to a dry box. Pd(acac)$_2$ (0.024 g, 0.08 mmol) and DANFABA (0.19 g, 0.24 mmol) were added to the vessel in 6a and Pd(acac)$_2$ (0.049 g, 0.16 mmol) and DANFABA (0.39 g, 0.48 mmol) were added to the vessel in Example 6b. The vessels were seal and each taken out of the dry box. Formic acid (0.37 g, 8.0 mmol) was added to the vessel in 6b. The solutions were heated to 115° C. and stirred for 18 hours. The reaction mixtures were then allowed to cool to room temperature, and GPC analysis (for molecular weight and conversion) was performed.

TABLE 18

| Ex # | % Formic Acid | % Conversion | Mw | Mw/Mn |
|---|---|---|---|---|
| 18a | 0% | 93% | 8040 | 1.97 |
| 18b | 10% | 98% | 3970 | 1.46 |

Example 19

Polymerization of HFANB/TFSNB/FPCNB (75/20/5 and 80/15/5)

Appropriate sized reaction vessels in 7a and 7b was charged with HFANB (16.4 g, 60.0 mmol), TFSNB (4.08 g, 16.0 mmol), FPCNB (1.08 g, 4.0 mmol), 24.0 g toluene, 8.0 g ethyl acetate and stirred. An appropriate sized reaction vessel in 7c was charged with HFANB (17.5 g, 64.0 mmol), TFSNB (3.06 g, 12.0 mmol), FPCNB (1.08 g, 4.0 mmol), 24.0 g toluene, 8.0 g ethyl acetate and stirred. These solutions were sealed and each transferred to a dry box. Pd(acac)$_2$ (0.024 g, 0.079 mmol) and DANFABA (0.19 g, 0.24 mmol) were added to each reaction vessel. The vessels were seal and each taken out of the dry box. Formic acid (0.37 g, 8.0 mmol) were added to the vessels in 7b and 7c and the solutions were heated to 115° C. and stirred for 18 hours. The reaction mixtures were then allowed to cool to room temperature, and GPC analysis (for molecular weight and conversion) was performed.

TABLE 19

| Ex # | % Formic Acid | % Conv. | Mw | Mw/Mn |
|---|---|---|---|---|
| 19a | 0% | 88% | 6830 | 1.65 |
| 19b | 10% | >95% | 3740 | 1.43 |
| 19c | 10% | >95% | 3580 | 1.11 |

Example 20

Polymerization of BuNB/NBC$_2$H$_4$CO$_2$Et (50/50)

An appropriate sized reaction vessel was charged with NBC$_2$H$_4$CO$_2$Et (1.0 g, 5.15 mmol), BuNB (0.77 g, 5.15 mmol), 1.49 g toluene, 0.50 g ethyl acetate and stirred. This solution was sealed. The desired amount of formic acid was added and the solution was heated to 110° C., at which point a solution containing Pd(acac)$_2$ (0.0064 g, 0.02 mmol), DANFABA (0.05 g, 0.062 mmol) dissolved in 0.69 mL ethyl acetate was added to the vessel, and the solution was stirred for 16 hours. The mixture was then allowed to cool to room temperature, and total solids analysis (for conversion) and GPC analysis (for molecular weight) were performed.

TABLE 20

| Ex # | % Formic Acid | % Conv. | Mw | Mw/Mn |
|---|---|---|---|---|
| 20a | 0% | 100% | 13200 | 4.10 |
| 20b | 5% | 100% | 7710 | 2.82 |
| 20c | 10% | 100% | 6120 | 2.29 |

Example 21

Polymerization of PhOAcNB

An appropriate sized reaction vessel was charged with PhOAcNB (7.5 g, 35.0 mmol), 7.98 g toluene and stirred. This solution was sealed. The desired amount of formic acid was added and the solution was heated to 110° C., at which point a solution containing Pd-910 (0.032 g, 0.035 mmol), DANFABA (0.084 g, 0.105 mmol) dissolved in 3.64 mL toluene was added, and the solution was stirred for 16 hours. The mixture was then allowed to cool to room temperature, and total solids analysis (for conversion) and GPC analysis (for molecular weight) were performed.

TABLE 21

| Ex # | % Formic Acid | % Conv | Mw | Mw/Mn |
|---|---|---|---|---|
| 21a | 0% | 100% | 4600 | 1.75 |
| 21b | 10% | 100% | 3770 | 1.66 |
| 21c | 20% | 100% | 3620 | 1.65 |
| 21d | 40% | 100% | 3330 | 1.59 |

Example 22

Polymerization of HFANB/MeOAcNB (60/40)

A solution of HFANB (115.1 g, 0.42 mmol), MeOAcNB (46.5 g, 0.28 mmol), Pd(acac)$_2$ (0.11 g, 0.35 mmol), DANFABA (0.84 g, 1.05 mmol), 180 g toluene, and 60 g ethyl acetate was made. This master batch was divided into six appropriate sized vessels having the same quantity (10A-F) and one appropriate size vessel of a different quantity (10G). The desired amount of formic acid was added to these vessels and the mixture was heated to the desired temperature (see table) for 19 hours. The mixture was then allowed to cool to room temperature, and total solids analysis (for conversion) and GPC analysis (for molecular weight) were carried out on the resulting mixture. The polymer was then purified to remove residual catalyst and then precipitated into heptane and dried in a vacuum oven. The optical density of the dried polymer at 193 nm was determined and molecular weight (Mw) was determined by GPC analysis both after polymerization and precipitation.

TABLE 22

| Ex # | Poly. T(° C.) | Formic Acid mol % on monomer | % Conv. | Mw* | Mw** | OD ($\mu^{-1}$) |
|---|---|---|---|---|---|---|
| 22a | 60 | 6.0 | 76 | 6360 | 6670 | 0.173 |
| 22b | 60 | 12.0 | 97 | 4660 | 4910 | 0.168 |

TABLE 22-continued

| Ex # | Poly. T(° C.) | Formic Acid mol % on monomer | % Conv. | Mw* | Mw** | OD (μ$^{-1}$) |
|---|---|---|---|---|---|---|
| 22g | 60 | 18.0 | 86 | 4530 | 4960 | 0.166 |
| 22c | 80 | 6.0 | 100 | 4500 | 4710 | 0.205 |
| 22d | 80 | 12.0 | 100 | 3710 | 4140 | 0.169 |
| 22e | 100 | 6.0 | 97 | 3860 | 4120 | 0.268 |
| 22f | 100 | 12.0 | 97 | 3380 | 3700 | 0.214 |

*GPC after polymerization.
**GPC after precipitation.

Example 23

Polymerization of HFANB/t-BuEsNB (50/50)

In an appropriate sized reaction vessel, a solution of HFANB (6.85 g, 0.025 mmol), t-BuEsNB (4.85 g, 0.025 mmol), and 18 g toluene were mixed and added to a reaction vessel. Pd(acac)$_2$ (0.106 g, 0.349 mmol) and DANFABA (0.841 g, 1.05 mmol) were added to the vessel. The desired amount of formic acid was added and the mixture was heated to 115° C. for 20 hours. The mixture was then allowed to cool to room temperature, and total solids analysis (for conversion) and GPC analysis (for molecular weight) were performed.

TABLE 23

| Ex # | % Formic Acid | % Conversion | Mw | Mw/Mn |
|---|---|---|---|---|
| 23a | 0 | >95 | 2510 | 1.65 |
| 23b | 4 | >95 | 2170 | 1.55 |
| 23c | 8 | >95 | 2020 | 1.51 |
| 23d | 12 | >95 | 1830 | 1.48 |

Example 24

Polymerization of TFSNB/FPCNB/HFANB (20/10/70)

An appropriate sized reaction vessel was charged with TFSNB (3.06 g, 0.012 mmol), FPCNB (1.62 g, 0.006 mmol), HFANB (11.52 g, 0.042 mmol), DANFABA (0.144 g, 0.18 mmol), 16.2 g toluene, 6 g ethyl acetate and stirred. The desired amount of formic acid (see table) was added to the vessel. The mixture was then heated to the desired temperature (see table) at which point Pd(acac)$_2$ (0.018 g, 0.06 mmol) was added to the mixture with a small amount of ethyl acetate and heated for 16 hours. The reaction mixture was then allowed to cool to room temperature and total solids determination (for conversion) and GPC analysis (for molecular weight) was performed. Residual catalyst and monomer was removed from 12h and 12j. The optical densities (OD) at 193 nm of these two examples are reported in the table. The composition of 12h and 12j were 20:10:70 and 21:9:69 of TFSNB:FPCNB:HFANB, respectively, from $^1$H NMR analysis.

TABLE 24

| Ex # | Temp. (° C.) | Formic Acid (mol % on monomer) | % Conversion | Mw | Mw/Mn | OD (μ$^{-1}$) |
|---|---|---|---|---|---|---|
| 24a | 115 | 0.1 | 58 | 7170 | 1.63 | |
| 24b | 115 | 2 | 97 | 4420 | 1.40 | |
| 24c | 115 | 6 | 99 | 3790 | 1.38 | |
| 24d | 115 | 10 | 100 | 3360 | 1.31 | |
| 24e | 115 | 15 | 97 | 3120 | 1.27 | |
| 24f | 100 | 0.1 | 45 | 11140 | 1.73 | |
| 24g | 100 | 2 | 65 | 6090 | 1.53 | |
| 24h | 100 | 6 | 93 | 4380 | 1.38 | 0.22 |
| 24i | 100 | 10 | 100 | 3680 | 1.35 | |
| 24j | 100 | 15 | 99 | 3570 | 1.34 | 0.18 |

Example 25

Polymerization of TFSNB/TFENB/MCPNB (30/30/40)

An appropriate sized reaction vessel was charged with TFSNB (3.83 g, 0.015 mmol), TFENB (3.36 g, 0.015 mmol), MCPNB (4.4 g, 0.02 mmol), 17.1 g of toluene and stirred. LiFABA (0.065 g, 0.075 mmol) and Pd(acac)$_2$ (0.008 g, 0.025 mmol) was added to the vessel. The desired amount of formic acid was added and the mixture was heated for 17 hours. The reaction mixture was then allowed to cool to room temperature and total solids determination (for conversion) and GPC analysis (for molecular weight) was performed.

TABLE 25

| Ex # | % Formic Acid | % Conversion | Mw | Mw/Mn |
|---|---|---|---|---|
| 25a | 0 | 43 | 1860 | 1.39 |
| 25b | 3 | 68 | 1500 | 1.32 |
| 25c | 6 | 70 | 1360 | 1.30 |
| 25d | 9 | 52 | 1620 | 1.34 |
| 25e* | 6 | 75 | 1820 | 1.45 |

*trifluorotoluene solvent

Example 26

Polymerization of BuNB

In an appropriate sized reaction vessel, a solution of BuNB (5.26 g, 0.035 mmol), N,N-dimethylanilinium tris(trifluoromethylsulfonyl)methide (0.028 g, 0.053 mmol), and 6.63 g cyclohexane were placed in the vessel and stirred. The vessel was sealed and the desired amount of formic acid was added. The solution was heated to 60° C. and Pd(acac)$_2$ (0.0053 g, 0.018 mmol) was added in 1.2 mL toluene and stirred for 17 hours. The mixture was then cooled to room temperature and total solids determination (for conversion) and GPC analysis (for molecular weight) was performed. Two of the polymers (14a and 14d) were further purified by removal of residual catalyst and by removal of monomer by precipitation from hexane, dried in a vacuum oven overnight. Optical density (OD) at 193 nm was determined for these two polymers.

TABLE 26

| Ex # | % Conversion | % Formic Acid | Mw | Mw/Mn | OD (μ-1) |
|---|---|---|---|---|---|
| 26a | 100 | 3 | 6130 | 2.06 | 0.20 |
| 26b | 100 | 5 | 4900 | 1.84 | |
| 26c | 100 | 10 | 5080 | 1.81 | |
| 26d | 100 | 17 | 5780 | 1.99 | 0.22 |
| 26e | 100 | 20 | 6700 | 1.98 | |
| 26f | 100 | 30 | 7970 | 2.17 | |
| 26g | 100 | 35 | 7790 | 2.10 | |
| 26h | 100 | 40 | 8260 | 2.21 | |

Example 27

Polymerization of NB

In an appropriate sized reaction vessel, a solution of NB (5.65 g, 0.06 mmol), N,N-dimethylanilinium tris(trifluoromethylsulfonyl)methide (0.048 g, 0.090 mmol), and 7.43 g cyclohexane were placed in the vessel and stirred. The vessel was sealed and the desired amount of formic acid was added. The solution was heated to 60° C. and Pd(acac)$_2$ (0.0091 g, 0.03 mmol) was added in 1.0 mL toluene and stirred for 17 hours. The mixture was then cooled to room temperature and total solids determination (for conversion) and GPC analysis (for molecular weight) was performed.

TABLE 27

| Ex # | % Conversion | % Formic Acid | Mw | Mw/Mn |
|---|---|---|---|---|
| 27a | 100 | 3 | 2360 | 2.63 |
| 27b | 100 | 5 | 1970 | 2.52 |
| 27c | 100 | 10 | 2010 | 2.68 |
| 27d | 100 | 20 | 3430 | 3.46 |

Example 28

Polymerization of DecNB

In an appropriate sized reaction vessel, a solution of DecNB (8.20 g, 0.0350 mol), N,N-dimethylanilinium tris(trifluoromethylsulfonyl)methide (0.028 g, 0.053 mmol), and 11.16 g cyclohexane were placed in the vessel and stirred. The vessel was sealed and the desired amount of formic acid was added. The solution was heated to 60° C. and Pd(acac)$_2$ (0.0053 g, 0.018 mmol) was added in 1.2 mL toluene and stirred for 17 hours. The mixture was then cooled to room temperature and total solids determination (for conversion) and GPC analysis (for molecular weight) was performed.

TABLE 28

| Ex # | % Conversion | % Formic Acid | Mw | Mw/Mn |
|---|---|---|---|---|
| 28a | 69 | 3 | 5110 | 1.55 |
| 28b | 82 | 5 | 3730 | 1.36 |
| 28c | 87 | 10 | 3750 | 1.34 |
| 28d | 82 | 20 | 4120 | 1.38 |

Example 29

Polymerization of PENB

In an appropriate sized reaction vessel, a solution of PENB (6.94 g, 0.035 mmol), N,N-dimethylanilinium tris(trifluoromethylsulfonyl)methide (0.028 g, 0.053 mol), and 9.0 g cyclohexane were placed in the vessel and stirred. The vessel was sealed and the desired amount of formic acid was added. The solution was heated to 60° C. and Pd(acac)$_2$ (0.0053 g, 0.018 mmol) was added in 1.2 mL toluene and stirred at 60° C. for 17 hours. The mixture was then cooled to room temperature and total solids determination (for conversion) and GPC analysis (for molecular weight) was performed.

TABLE 29

| Ex # | % Conversion | % Formic Acid | Mw | Mw/Mn |
|---|---|---|---|---|
| 29a | 91 | 3 | 3940 | 1.54 |
| 29b | 100 | 5 | 3680 | 1.65 |
| 29c | 93 | 10 | 3060 | 1.56 |
| 29d | 86 | 20 | 4210 | 1.53 |

Example 30

Polymerization of BuNB

In an appropriate sized reaction vessel, a solution of BuNB (5.26 g, 0.035 mmol) and 6.74 g p-methane were added in the vessel and stirred. DANFABA (0.084 g, 0.105 mmol) was added to the vessel and the desired amount of formic acid was added. The solution was heated to the appropriate temperature (see table) at which point $Pd(acac)_2$ (0.011 g, 0.035 mmol) was added in a small amount of ethyl acetate. The mixture was stirred at temperature for 17 hours. The mixture was then cooled to room temperature and total solids determination (for conversion) and GPC analysis (for molecular weight) was performed.

TABLE 30

| Ex # | Temp. (° C.) | % Formic Acid | % Conversion | Mw | Mw/Mn |
|---|---|---|---|---|---|
| 30a | 115 | 0% | 100 | 12790 | 5.57 |
| 30b | 115 | 10% | 97 | 8490 | 3.44 |
| 30c | 115 | 20% | 93 | 6810 | 2.85 |
| 30d | 100 | 0% | 99 | 17690 | 5.54 |
| 30e | 100 | 10% | 98 | 8630 | 3.08 |
| 30f | 100 | 20% | 95 | 7050 | 2.68 |
| 30g | 80 | 0% | 100 | 34770 | 6.33 |
| 30h | 80 | 10% | 100 | 14060 | 3.68 |
| 30i | 80 | 20% | 97 | 9690 | 2.89 |
| 30j | 60 | 0% | 100 | 107350 | 8.52 |
| 30k | 60 | 10% | 100 | 17110 | 3.89 |
| 30l | 60 | 20% | 100 | 11610 | 3.14 |

Example 31

Polymerization of $NBEtCO_2Et$

In an appropriate sized reaction vessel, a solution of $NBEtCO_2Et$ (7.77 g, 0.04 mmol), DANFABA (0.048 g, 0.06 mmol), and 10.8 g toluene were added to the vessel and stirred. The desired amount of formic acid was added and the solution was heated to the appropriate temperature (see table) at which point $Pd(acac)_2$ (0.006 g, 0.02 mmol) was added in 0.6 g toluene. The mixture was stirred at temperature for 18 hours. The mixture was then cooled to room temperature and total solids determination (for conversion) and GPC analysis (for molecular weight) was performed. For 19g, 19h, and 19i, monomer and catalyst residues were removed and the polymer was precipitated from heptane and dried in a vacuum oven. The optical density (OD) of the polymer was then determined (see table).

TABLE 31

| Ex # | Temp (° C.) | Formic Acid mol % on monomer | % Conv. (TS) | Mw | Mw/Mn | OD (µ$^{-1}$) |
|---|---|---|---|---|---|---|
| 31a | 80 | 10 | 99 | 7270 | 2.39 | |
| 31b | " | 15 | 97 | 6420 | 2.21 | |
| 31c | " | 20 | 96 | 5720 | 2.08 | |
| 31d | 90 | 5 | 100 | 6620 | 2.54 | |
| 31e | " | 10 | 97 | 5540 | 2.13 | |
| 31f | " | 15 | 96 | 4840 | 1.92 | |
| 31g | 100 | 5 | 100 | 5150 | 2.4 | 0.40 |
| 31h | " | 10 | 98 | 4190 | 2.07 | 0.34 |
| 31i | " | 15 | 94 | 3900 | 1.87 | 0.33 |

Example 32

Polymerization of HFANB

In an appropriate sized reaction vessel, a solution of HFANB (11.0 g, 0.04 mmol), DANFABA (0.048 g, 0.06 mmol), and 15.1 g toluene were added to the vessel and stirred. The desired amount of formic acid was added and the vessel was sealed and then heated to 90 C. The catalyst, $Pd(acac)_2$ (0.006 g, 0.02 mmol) in 1.2 g toluene was added to the vessel and stirred for 18 hours. The reaction mixture was then cooled and subjected to total solids analysis (for conversion) and GPC analysis (for molecular weight).

TABLE 32

| Ex # | % Formic Acid | % Conversion | Mw | Mw/Mn |
|---|---|---|---|---|
| 32a | 0% | 74% | 32030 | 2.98 |
| 32b | 5% | 100% | 5590 | 1.61 |
| 32c | 10% | 100% | 5170 | 1.55 |

Example 33

Polymerization of HFANB

In an appropriate sized reaction vessel, a solution of HFANB (11.0 g, 0.04 mmol), DANFABA (0.048 g, 0.06 mmol), and 15.1 g toluene were added to the vessel and stirred. The desired amount of formic acid was added and the vessel was sealed and then heated to 90 C. The catalyst, bis(tetramethylheptanedionato)palladium (II) (0.009 g, 0.02 mmol) in 1.2 g toluene was added to the vessel and stirred for 18 hours. The reaction mixture was then cooled and subjected to total solids analysis (for conversion) and GPC analysis (for molecular weight).

TABLE 33

| Ex # | % Formic Acid | % Conversion | Mw | Mw/Mn |
|---|---|---|---|---|
| 33a | 0% | 37% | 56420 | 1.97 |
| 33b | 5% | 100% | 5170 | 1.53 |
| 33c | 10% | 100% | 5060 | 1.49 |

Example 34

Polymerization of HFANB

In an appropriate sized reaction vessel, a solution of HFANB (11.0 g, 0.04 mmol), DANFABA (0.048 g, 0.06 mmol), and 15.1 g toluene were added to the vessel and stirred. The desired amount of formic acid was added and the vessel was sealed and then heated to 90 C. The catalyst, bis(benzoylacetonato)palladium (II) (0.009 g, 0.02 mmol) in 1.2 g toluene was added to vessel and stirred for 18 hours. The reaction mixture was then cooled and subjected to total solids analysis (for conversion) and GPC analysis (for molecular weight).

TABLE 34

| Ex # | % Formic Acid | % Conversion | Mw | Mw/Mn |
|---|---|---|---|---|
| 34a | 0% | 48% | 44020 | 2.41 |
| 34b | 5% | 100% | 5110 | 1.54 |
| 34c | 10% | 100% | 4800 | 1.51 |

Example 35

Polymerization of HFANB

In an appropriate sized reaction vessel, a solution of HFANB (11.0 g, 0.04 mmol), DANFABA (0.048 g, 0.06 mmol), and 15.1 g toluene were added to the vessel and stirred. The desired amount of formic acid was added and the vessel was sealed and then heated to 90 C. The catalyst, $Pd(CF_3COCHCOCF_3)_2$ (0.010 g, 0.02 mmol) in 1.2 g toluene was added to vessel and stirred for 18 hours. The reaction mixture was then cooled and subjected to total solids analysis (for conversion) and GPC analysis (for molecular weight).

TABLE 35

| Ex # | % Formic Acid) | % Conversion | Mw | Mw/Mn |
|---|---|---|---|---|
| 35a | 0% | 16% | 17510 | 1.96 |
| 35b | 5% | 67% | 15360 | 1.55 |
| 35c | 10% | 79% | 14170 | 1.58 |

Example 36

Polymerization of HFANB

For 24a-i, an appropriate size reaction vessel was charged with HFANB (129.8 g, 470.0 mmol) and 195.6 g of toluene and sealed. DANFABA (2.26 g, 2.82 mmol) was added to the solution. The appropriate catalyst (see table) (0.075 mmol each) was added to 25 g portions of the above solution and sealed. The desired amount of formic acid was added to the solution and heated to 100° C. and stirred for 18 hours. The reaction mixture was then allowed to cool to room temperature and GPC analysis (for molecular weight) and total solid measurement (for conversion) were performed.

For 24j-l, an appropriate size reaction vessel was charged with HFANB (30.2 g, 110 mmol) and 44.5 g of toluene and sealed. DANFABA (0.53 g, 0.66 mmol) and $Pd_2(dba)_3$ (0.20 g, 0.22 mmol) were added to the vessel and separated into 25 g portions and sealed. The desired amount of formic acid (FA) was added to the 25 g portions of this solution. The solutions were heated to 100° C. for 17 hours. The reaction mixture was then allowed to cool to room temperature and GPC analysis (for molecular weight) and total solid measurement (for conversion) were performed.

TABLE 36

| Ex # | Pd catalyst | Pd catalyst | FA (%) | % Conversion | Mw | Mw/Mn |
|---|---|---|---|---|---|---|
| 36a | Pd(OAc)₂* | 0.017 g | 0 | 100 | 9480 | 2.35 |
| 36b | Pd(OAc)₂ | 0.017 g | 5.0 | 100 | 5610 | 1.71 |
| 36c | Pd(OAc)₂ | 0.017 g | 10.0 | 100 | 5580 | 1.68 |
| 36d | Pd(acac)₂** | 0.023 g | 0 | 100 | 9960 | 2.28 |
| 36e | Pd(acac)₂ | 0.023 g | 5.0 | 100 | 5540 | 1.68 |
| 36f | Pd(acac)₂ | 0.023 g | 10.0 | 100 | 5320 | 1.67 |
| 36g | Pd(CF₃COCHCOCF₃)₂*** | 0.039 g | 0 | 42 | 13500 | 2.16 |
| 36h | Pd(CF₃COCHCOCF₃)₂ | 0.039 g | 5.0 | 81 | 12480 | 1.80 |
| 36i | Pd(CF₃COCHCOCF₃)₂ | 0.039 g | 10.0 | 68 | 10080 | 1.75 |
| 36j | Pd₂(dba)₃**** | 0.067 g | 0 | 81 | 17070 | 2.40 |
| 36k | Pd₂(dba)₃ | 0.067 g | 5.0 | 100 | 5400 | 1.68 |
| 36l | Pd₂(dba)₃ | 0.067 g | 10.0 | 100 | 5680 | 1.68 |

*Palladium(II) acetate.
**Palladium(II) acetylacetonate,
***Palladium(II) hexafluoroacetylacetonate,
****Palladium(0) dibenzylideneacetone.

Example 37

Polymerization of TFSNB/FPCNB/HFANB (60/20/20)

An appropriate sized reaction vessel was charged with TFSNB (18.4 g, 72.0 mmol), FPCNB (6.48 g, 24.0 mmol), HFANB (6.59 g, 24.0 mmol), 35.0 g of toluene, 11.7 g of ethyl acetate and sealed. DANFABA (0.288 g, 0.36 mmol) and $Pd(OAc)_2$ (0.027 g, 0.12 mmol) were added to the solution and separated into 25 g portions and sealed. The desired amount of formic acid was added the 25 g portions of this solution. The solution was heated to 100° C. and stirred for 17 hours. The reaction mixture was then allowed to cool to room temperature and GPC analysis (for molecular weight) and total solid measurement (for conversion) were performed.

TABLE 37

| Ex # | Pd catalyst | % Formic Acid | % Conv. | Mw | Mw/Mn |
|---|---|---|---|---|---|
| 37a | Pd(OAc)₂ | 0 | 16 | 9080 | 1.47 |
| 37b | Pd(OAc)₂ | 5.0 | 41 | 3660 | 1.33 |
| 37c | Pd(OAc)₂ | 10.0 | 44 | 3080 | 1.34 |

Example 38
Polymerization of BuNB/TESNB (90/10)

In an appropriate sized reaction vessel, BuNB (8.11 g, 0.054 mmol), TESNB (1.54 g, 0.006 mmol), N,N-dimethylanilinium tris(trifluoromethylsulfonyl)methide (0.048 g, 0.09 mmol), and 13.4 g cyclohexane were added to the vessel and stirred. The desired amount of formic acid was added and the vessel was sealed and then heated to 60 C. The catalyst, Pd(acac)$_2$ (0.009 g, 0.03 mmol) in 0.9 g toluene was added to the vessel and the mixture was stirred for 17 hours. The reaction mixture was then cooled and subjected to total solids analysis (for conversion) and GPC analysis (for molecular weight). One polymer (26c) was further purified to remove residual monomer by precipitation from acetone and dried in a vacuum oven overnight. The composition of the dried polymer was 89:11 BuNB:TESNB by $^1$H-NMR analysis.

TABLE 38

| Ex # | % Formic Acid | % Conversion | Mw | Mw/Mn |
|---|---|---|---|---|
| 38a | 0% | 26% | 5590 | 1.83 |
| 38b | 3% | 79% | 3440 | 1.76 |
| 38c | 6% | 81% | 3110 | 1.94 |

Example 39
Polymerization of BuNB/AGENB (90/10)

In an appropriate sized reaction vessel, BuNB (8.11 g, 0.054 mmol), AGENB (1.08 g, 0.006 mmol), N,N-dimethylanilinium tris(trifluoromethylsulfonyl)methide (0.048 g, 0.09 mmol), and 12.8 g toluene were added to the vessel and stirred. The desired amount of formic acid was added and the vessel was sealed and then heated to 60 C. The catalyst, Pd(acac)$_2$ (0.009 g, 0.03 mmol) in 0.9 g toluene was added to the vessel and the mixture was stirred for 17 hours. The reaction mixture was then cooled and subjected to total solids analysis (for conversion) and GPC analysis (for molecular weight). One polymer (27c) was further purified to remove residual monomer by precipitation from acetone and dried in a vacuum oven overnight. The composition of the dried polymer was 89:11 BuNB:AGENB by 1H-NMR analysis.

TABLE 39

| Ex # | % Formic Acid | % Conversion | Mw | Mw/Mn |
|---|---|---|---|---|
| 39a | 0% | 16% | 19100 | 1.52 |
| 39b | 3% | 35% | 3120 | 2.10 |
| 39c | 6% | 40% | 2290 | 1.95 |

Example 40
Polymerization of HFANB/MeOAcNB. (55/45)

A solution of HFANB (7.54 g, 27.5 mmol), MeOAcNB (3.74 g, 22.5 mmol), Pd-304 (0.008 g, 0.025 mmol), DANFABA (0.060 g, 0.075 mmol), 12.5 g toluene, and 4.2 g ethyl acetate was made. The desired amount of formic acid was added to these vessels and the mixture was heated to 90 C for 16 hours. The mixture was then allowed to cool to room temperature, and total solids analysis (for conversion) and GPC analysis (for molecular weight) were carried out on the resulting mixture. The polymer was then purified to remove residual catalyst and then precipitated into heptane and dried in a vacuum oven. The optical density of the dried polymer at 193 nm was determined and molecular weight (Mw) was determined by GPC analysis before polymerization and after purification and precipitation. See Table 40 for results. The copolymers from 28a and 28b were analyzed by MALDI-TOF MS and by 1H NMR spectrometry. The major molecular ion series in the MALDI-TOF MS was consistent with copolymers of HFANB and MeOAcNB with hydrogen end groups. Consistent with this conclusion was the relative absence of olefinic end groups observed in the 1H NMR spectra of 28a and 28b.

TABLE 40

| | | | Reaction Mixture | | After precipitation | | |
|---|---|---|---|---|---|---|---|
| Ex # | FA (%) | % Conv | Mw | Mw/Mn | Mw | Mw/Mn | OD (193) |
| 40a | 6 | 100 | 3304 | 1.45 | 4172 | 1.37 | 0.22 |
| 40b | 12 | 100 | 3045 | 1.44 | 3593 | 1.30 | 0.21 |

Figure 2:
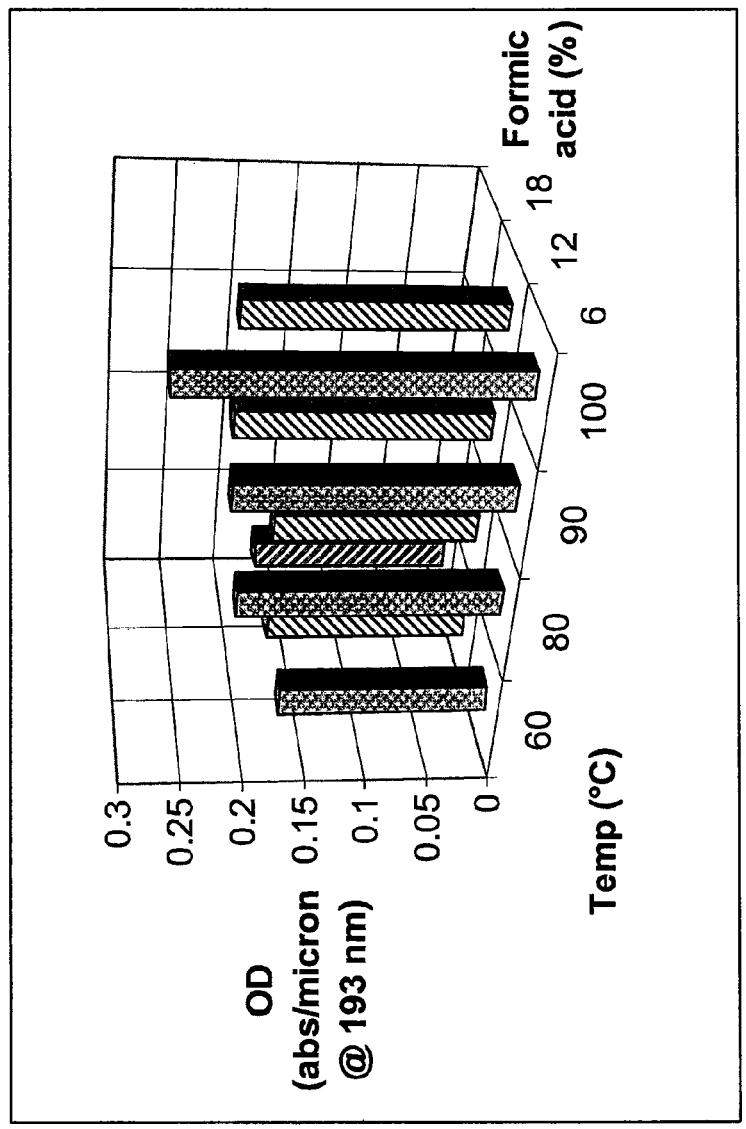
FIG. 2 shows a 3-D plot of optical density (OD) as a function of temperature and concentration of formic acid for polymers prepared according to Polymerization Examples 22 and 40.
Figure 3:
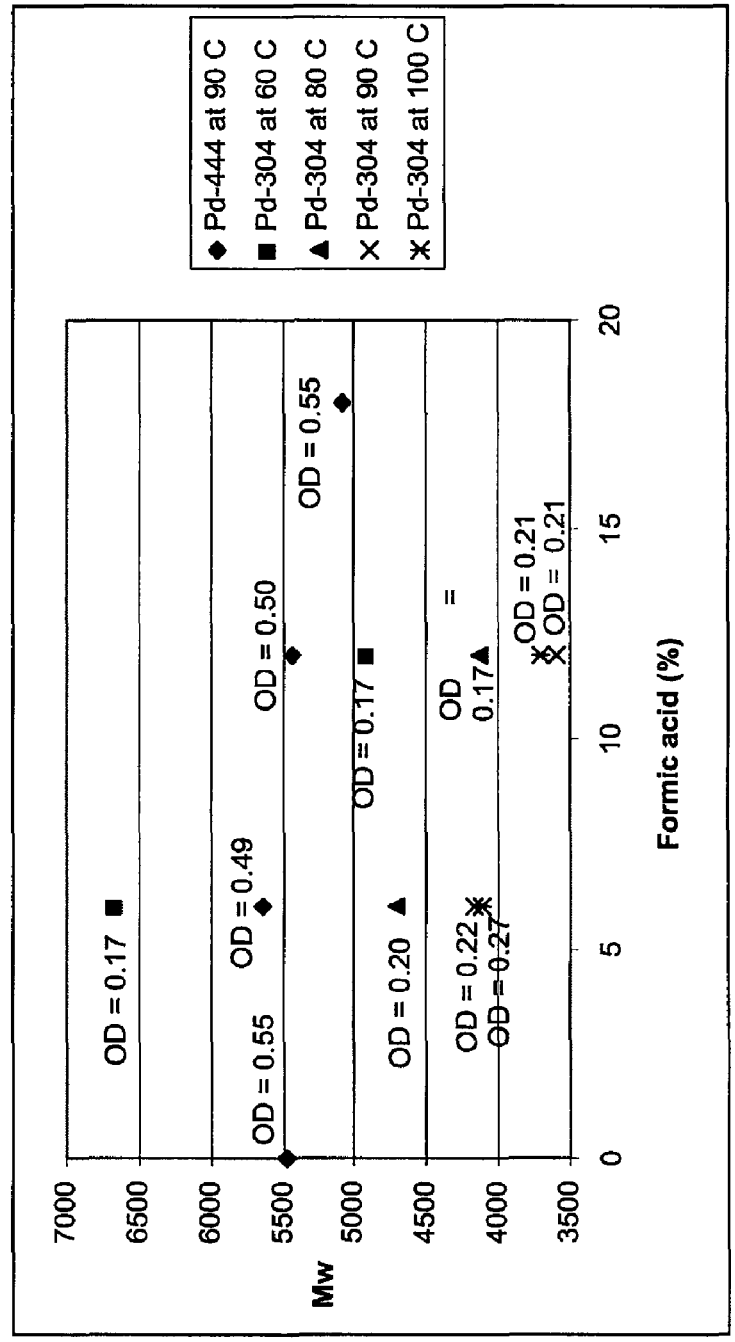
FIG. 3 shows a plot of molecular weight (Mw) as a function of concentration of formic acid for copolymers of HFANB/MeOAcNB made using different palladium catalysts and at different temperatures.

A 3-D plot of the effect of polymerization temperature and formic acid concentration on optical density for polymers made according to Polymerization Examples 22 and 40 is presented in Plot B of FIG. 2. The plot shows that for the Pd-304 catalyst system, higher polymerization temperature results in a higher optical density. The figure also shows that, for the same polymerization temperature, formic acid can be used to lower the optical density. In Plot C of FIG. 3, Mw vs. formic acid concentration is shown for HFANB/MeOAcNB copolymers made using Pd-444 and Pd-304 at different temperatures (data from Comparative Example 2 and Examples 22 and 40). The plot shows that formic acid controls the molecular weight of copolymer made using Pd-304 and produces a copolymer with a substantially lower OD.

Example 41
Polymerization of HFANB/MeOAcNB (55/45)

A reaction vessel was charged with 68.0 g (248 mmol) of HFANB, 33.7 g (203 mmol) of MeOAcNB, 114.5 g of toluene, 38.2 g ethyl acetate, sealed, sparged with nitrogen for 30 minutes and transferred to a dry box. Pd-304 (0.034 g, 0.11 mmol) or Pd-416 (0.045 g, 0.11 mmol) added to 120 g portions of the above solution. The 120 g portions of the monomer mixtures containing the catalysts were divided to 30 g portions and DANFABA (0.022 g, 0.027 mmol), LiFABA (0.024 g, 0.027 mmol), dimethylaniline (0.007 g, 0.057 mmol), t-butylamine (0.0040 g, 0.055 mmol), diethylamine (0.0040 g, 0.055 mmol) and acetonitrile (0.0020 g, 0.050 mmol) was added as indicated in Table 41. Formic acid (0.31 g, 6.74 mmol) was added to the vials indicated and heated to 70° C. for 17 hours (with the exception of vial d which was kept at RT). Total solid measurements were made to determine the conversion to polymers.

TABLE 41

| Ex # | Pd(acac)$_2$ | Pd(t-Buacac)$_2$ | FA | T °C. | DANFABA | LiFABA | t-BuNH$_2$ | NEt$_2$H | NMe$_2$Ph | CH$_3$CN | TS (%) | conv (%) |
|---|---|---|---|---|---|---|---|---|---|---|---|---|
| 41a | 1 | 0 | 12% | 70 | 1 | 0 | 0 | 0 | 0 | 0 | 41.2% | 100.0% |
| 41b | 1 | 0 | 12% | 70 | 0 | 1 | 0 | 0 | 0 | 0 | 26.9% | 67.3% |
| 41c | 1 | 0 | 0% | 70 | 0 | 1 | 0 | 0 | 0 | 0 | 23.6% | 59.0% |

TABLE 41-continued

| Ex # | Pd(acac)$_2$ | Pd(t-Buacac)$_2$ | FA | T °C. | DANFABA | LiFABA | t-BuNH$_2$ | NEt$_2$H | NMe$_2$Ph | CH$_3$CN | TS (%) | conv (%) |
|---|---|---|---|---|---|---|---|---|---|---|---|---|
| 41d | 1 | 0 | 0% | 23 | 0 | 1 | 0 | 0 | 0 | 0 | 1.5% | 3.8% |
| 41e | 1 | 0 | 12% | 70 | 0 | 1 | 0 | 0 | 2 | 0 | 5.9% | 14.8% |
| 41f | 1 | 0 | 12% | 70 | 0 | 1 | 0 | 0 | 0 | 2 | 20.6% | 51.5% |
| 41g | 1 | 0 | 0% | 70 | 1 | 0 | 0 | 0 | 0 | 2 | 6.7% | 16.8% |
| 41h | 1 | 0 | 12% | 70 | 1 | 0 | 0 | 0 | 0 | 2 | 22.2% | 55.5% |
| 41i | 1 | 0 | 12% | 70 | 3 | 0 | 0 | 0 | 0 | 2 | 30.5% | 76.3% |
| 41j | 0 | 1 | 12% | 70 | 1 | 0 | 0 | 0 | 0 | 0 | 40.1% | 100.0% |
| 41k | 0 | 1 | 12% | 70 | 0 | 1 | 0 | 0 | 0 | 0 | 20.8% | 52.0% |
| 41l | 0 | 1 | 12% | 70 | 0 | 1 | 2 | 0 | 0 | 0 | 1.9% | 4.8% |
| 41m | 0 | 1 | 12% | 70 | 0 | 1 | 0 | 2 | 0 | 0 | 3.3% | 8.3% |

* monomer:Pd = 2000:1, 17 hours

Example 42

Polymerization of HFANB/MeOAcNB (55/45)

A reaction vessel was charged with 8.29 g (30.2 mmol) of HFANB, 4.11 g (24.7 mmol) of MeOAcNB, 13.7 g of toluene, 4.57 g ethyl acetate, sealed, sparged with nitrogen for 30 minutes and transferred to a dry box. LiFABA (0.024 g, 0.028 mmol), DANFABA (0.022 g, 0.028 mmol), [(t-Buacac)Pd(t-BuNH$_2$)$_2$]FABA (0.031 g, 0.028 mmol), [(t-Buacac)Pd(NEt$_2$H)$_2$]FABA (0.031 g, 0.028 mol), [(acac)Pd(CH$_3$CN)$_2$]FABA (0.027 g, 0.028 mmol) and Pd-304 (0.0085 g, 0.028 mmol) was added as indicated in Table 42. Formic acid (0.300 g, 6.52 mmol) was added to the vials indicated in the aforementioned table and heated to 70° C. for 17 hours except for vials d and e which were held at RT. Total solid measurements were made to determine the conversion to polymers.

TABLE 42

| Ex # | catalyst | FA | T | DANFABA | TS (%) | conv. (%) |
|---|---|---|---|---|---|---|
| 42a | [(t-Buacac)Pd(t-BuNH$_2$)$_2$]FABA | 12% | 70 C. | 0 | 0.8% | 2.1% |
| 42b | [(t-Buacac)Pd(HNEt$_2$)$_2$]FABA | 12% | 70 C. | 0 | 0.5% | 1.1% |
| 42c | [(acac)Pd(MeCN)$_2$]FABA | 12% | 70 C. | 0 | 13.1% | 32.7% |
| 42d | [(acac)Pd(MeCN)$_2$]FABA | 0% | 23 C. | 0 | 1.2% | 3.0% |
| 42e | [(acac)Pd(MeCN)$_2$]FABA | 0% | 23 C. | 1 | 2.2% | 5.5% |
| 42f | [(acac)Pd(MeCN)$_2$]FABA | 0% | 70 C. | 0 | 0.7% | 1.8% |
| 42g | [(acac)Pd(MeCN)$_2$]FABA | 0% | 70 C. | 1 | 12.5% | 31.3% |
| 42h | [(acac)Pd(MeCN)$_2$]FABA | 12% | 70 C. | 1 | 35.6% | 89.0% |

* monomer:Pd = 2000:1, 17 hours

Example 43

Polymerization of HFANB/MeOAcNB (55/45)

To a 60 ml crimp cap vial was charged with 5.28 g (19.3 mmol) HFANB, 2.62 g (15.8 mmol) MeOAcNB, 0.042 g (0.053 mmol) N,N-dimethylanilinium tetrakis(pentafluorophenyl)borate, 6.6 g ethyl acetate and a stir bar. This solution was sealed and sparged with nitrogen for 40 min. The desired amount of formic acid was added and the solution was heated to 70° C., at which point a solution containing 0.011 g (0.018 mmol) (1,4-benzoquinone)(norbornene)palladium (0) dimer, dissolved in 1.1 g ethyl acetate was added, and the solution was stirred for 16 hours. The mixture was then allowed to cool to room temperature, and total solids analysis (for conversion) and GPC analysis (for molecular weight) were performed. For Example 1a, monomer and catalyst residues were removed and the polymer was precipitated from heptane and dried in a vacuum oven. The optical density (OD) of the polymer was then determined (see table).

TABLE 43

| Ex# | % Formic Acid | Conversion | MW | Mw/Mn | OD |
|---|---|---|---|---|---|
| 43a | 10% | 100% | 3730 | 1.54 | 0.16 |
| 43b | 15% | 100% | 2890 | 1.38 | |
| 43c | 20% | 100% | 2960 | 1.37 | |

Example 44

Polymerization of HFANB/MeOAcNB (55/45)

In a 60 ml crimp cap vial, 9.05 g (33.0 mmol) HFANB, 4.49 g (27.0 mmol) MeOAcNB, 0.072 g (0.090 mmol) N,N-dimethylanilinium tetrakis(pentafluorophenyl)borate and 17.2 g trifluorotoluene were added to the vial and stirred. The desired amount of formic acid was added and the solution was heated to 100° C., at which point a solution containing 0.027 g (0.030 mmol) Pd-910, dissolved in 2.7 g trifluorotoluene was added, and the solution was stirred for 18 hours. The mixture was then allowed to cool to room temperature, and total solids analysis (for conversion) and GPC analysis (for molecular weight) were performed.

TABLE 44

| Ex # | % Formic Acid | Conversion | MW | Mw/Mn |
|---|---|---|---|---|
| 44a | 10% | 100% | 12760 | 2.79 |
| 44b | 20% | 100% | 10250 | 2.49 |

Example 45

Polymerization of HFANB/MeOAcNB (55/45)

For 45a and 45b, to a 60 ml crimp cap vial was charged with 5.28 g (19.3 mmol) HFANB, 2.62 g (15.8 mmol) MeOAcNB, 0.168 g (0.210 mmol) N,N-dimethylanilinium tetrakis(pentafluorophenyl)borate, 4.2 g ethyl acetate and a stir bar. This solution was sealed and sparged with nitrogen for 40 min. The desired amount of formic acid was added and the solution was heated to 60° C., at which point a solution containing 0.032 g (0.035 mmol) Pd-916, dissolved in 3.2 g ethyl acetate was added, and the solution was stirred for 16 hours. The mixture was then allowed to cool to room temperature, and total solids analysis (for conversion) and GPC analysis (for molecular weight) were performed. Monomer and catalyst residues were then removed and the polymer was precipitated from heptane and dried in a vacuum oven. The optical density (OD) of the polymer was determined (see table).

For Examples 45c, 45d and 45e, to a 60 ml crimp cap vial was charged with 5.28 g (19.3 mmol) HFANB, 2.62 g (15.8 mmol) MeOAcNB, 0.084 g (0.11 mmol) N,N-dimethylanilinium tetrakis(pentafluorophenyl)borate, 8.6 g ethyl acetate and a stir bar. This solution was sealed and sparged with nitrogen for 40 min. The desired amount of formic acid was added and the solution was heated to 70° C., at which point a solution containing 0.016 g (0.017 mmol) Pd-916, dissolved in 3.2 g ethyl acetate was added, and the solution was stirred for 16 hours. The mixture was then allowed to cool to room temperature, and total solids analysis (for conversion) and GPC analysis (for molecular weight) were performed. For Examples 45d and 45e, monomer and catalyst residues were removed and the polymer was precipitated from heptane and dried in a vacuum oven. The optical density (OD) of the polymer was then determined (see table).

TABLE 45

| Ex# | Temp (° C.) | % Formic Acid | Conversion | MW | Mw/Mn | OD |
|---|---|---|---|---|---|---|
| 45a | 60 | 20% | 100% | 4540 | 1.60 | 0.17 |
| 45b | 60 | 30% | 100% | 4110 | 1.53 | 0.16 |
| 45c | 70 | 0% | 53% | 18250 | 1.90 | |
| 45d | 70 | 5% | 100% | 4170 | 1.56 | 0.17 |
| 45e | 70 | 10% | 96% | 4020 | 1.53 | 0.16 |

Example 46

Polymerization of MeOAcNB

To a 60 ml crimp cap vial was charged with 5.82 g (35.0 mmol) MeOAcNB, 0.168 g (0.210 mmol) N,N-dimethylanilinium tetrakis(pentafluorophenyl)borate, 6.3 g toluene and a stir bar. This solution was sealed and sparged with nitrogen for 40 min. The desired amount of formic acid was added and the solution was heated to 70° C., at which point a solution containing 0.032 g (0.035 mmol) Pd-916, dissolved in 2.1 g ethyl acetate was added, and the solution was stirred for 16 hours. The mixture was then allowed to cool to room temperature, and total solids analysis (for conversion) and GPC analysis (for molecular weight) were performed.

TABLE 46

| Ex # | % Formic Acid | Conversion | MW | Mw/Mn |
|---|---|---|---|---|
| 46a | 5% | 100% | 6030 | 2.33 |
| 46b | 10% | 100% | 3740 | 1.93 |

Example 47

Polymerization of HFIBONB

To a 60 ml crimp cap vial was charged with 6.08 g (20.0 mmol) HFIBONB, 0.192 g (0.240 mmol) N,N-dimethylanilinium tetrakis(pentafluorophenyl)borate, 6.7 g toluene, 0.4 g ethyl acetate and a stir bar. This solution was sealed and sparged with nitrogen for 40 min. The desired amount of formic acid was added and the solution was heated to 80° C., at which point a solution containing 0.037 g (0.040 mmol) Pd-916, dissolved in 1.8 g ethyl acetate was added, and the solution was stirred for the desired time (see table). The mixture was then allowed to cool to room temperature, and total solids analysis (for conversion) and GPC analysis (for molecular weight) were performed.

TABLE 47

| Ex# | Time | % Formic Acid | Conversion | MW | Mw/Mn |
|---|---|---|---|---|---|
| 47a | 16 h | 0% | 97% | 9710 | 2.08 |
| 47b | 16 h | 0.3% | 100% | 8550 | 1.81 |
| 47c | 23 h | 0.5% | 85% | 7150 | 1.57 |

Example 48

Polymerization of HFANB

To a 60-mL crimp cap vial was charged with 9.60 g (35.0 mmol) HFANB, 0.084 g (0.11 mmol) N,N-dimethylanilinium tetrakis(pentafluorophenyl)borate, 7.5 g ethyl acetate and a stir bar. This solution was sealed and sparged with nitrogen for 40 min. The desired amount of formic acid was added and the solution was heated to 90° C., at which point a solution containing 0.034 g (0.035 mmol) Pd-910, dissolved in 6.7 g ethyl acetate was added, and the solution was stirred for 16 hours. The mixture was then allowed to cool to room temperature, and total solids analysis (for conversion) and GPC analysis (for molecular weight) were performed. Monomer and catalyst residues were then removed and the polymer was precipitated from heptane and dried in a vacuum oven. The optical density (OD) of the polymer was determined (see table).

TABLE 48

| Ex # | % Formic Acid | Conversion | Mw | Mw/Mn | OD |
|---|---|---|---|---|---|
| 48a | 0% | 100% | 7490 | 1.72 | 0.53 |
| 48b | 5% | 100% | 6560 | 1.81 | 0.46 |

Example 49

Polymerization of MeOAcNB

To a 60-mL crimp cap vial was charged with 5.82 g (35.0 mmol) MeOAcNB, 0.084 g (0.11 mmol) N,N-dimethylanilinium tetrakis(pentafluorophenyl)borate, 5.2 g ethyl acetate and a stir bar. This solution was sealed and sparged with nitrogen for 40 min. The desired amount of formic acid was added and the solution was heated to 90° C., at which point a solution containing 0.034 g Pd-967 (0.035 mmol), dissolved in 3.4 g ethyl acetate was added, and the solution was stirred for 16 hours. The mixture was then allowed to cool to room temperature, and total solids analysis (for conversion) and GPC analysis (for molecular weight) were performed. Monomer and catalyst residues were then removed and the polymer was precipitated from heptane and dried in a vacuum oven. The optical density (OD) of the polymer was determined (see table).

TABLE 49

| Ex # | % Formic Acid | Conversion | Mw | Mw/Mn | OD |
|---|---|---|---|---|---|
| 49a | 2% | 100% | 4570 | 2.05 | 0.98 |
| 49b | 5% | 100% | 3040 | 1.80 | 0.73 |

Example 50

Polymerization of TFSNB/FHCNB (40/60)

In a 60 ml crimp cap vial, 4.08 g (16.0 mmol) TFSNB, 9.22 g (24.0 mmol) FHCNB, 15.2 g toluene and 1.0 g ethyl acetate were added to the vial and stirred. The desired amount of formic acid was added and the solution was heated to 100° C., at which point a solution containing 0.073 g (0.080 mmol) Pd-910, dissolved in 3.6 g ethyl acetate was added, and the solution was stirred for 18 hours. The mixture was then allowed to cool to room temperature, and total solids analysis (for conversion) and GPC analysis (for molecular weight) were performed.

TABLE 50

| Ex # | % Formic Acid | Conversion | Mw | Mw/Mn |
|---|---|---|---|---|
| 50a | 5% | 100% | 3910 | 1.40 |
| 50b | 10% | 98% | 3710 | 1.34 |
| 50c | 20% | 92% | 3520 | 1.35 |

As shown in Comparative Example 1, polymerization using [Pd(MeCN)$_4$](BF4) (Pd-444) results in a norbornene polymer having a diene terminal group. Comparative Example 2 demonstrates that such catalyst does not respond to a CTAA such as formic acid to provide molecular weight control of the resulting polymer. Further, Comparative Example 2 shows that the optical density of said polymer is not a function of CTAA (formic acid) concentration.

Polymerization Examples 13-24 and 31-42 demonstrate the molecular weight controlling effect of a CTAA for the embodiments of the present invention. That is to say that such examples show that by increasing the concentration of such a CTAA, the molecular weight of the resulting polymer generally decreases.

Polymerization examples 36j-l, 43, and 47 show that in combination with Pd(0) catalyst precursors, CTAA's such as formic acid control the molecular weight of the polymer and in the case of example 45, lower the OD.

Polymerization Examples 13, 38, 39, 41 and 42 are illustrative of the effect that a CTAA such as formic acid has on the molecular weight Mw and the percent conversion where a non-phosphorus or a non-boron containing catalyst is employed to initiate the polymerization. In Polymerization Examples 13-19, 23, 25, 28, 29, 32-35 and 37 the effect that a CTAA such as formic acid has optical density OD is demonstrated. Polymerization Examples 22, 24, 30 and 31 are illustrative of the effect that the combination of CTAA concentration, and polymerization temperature (T° C.) has on control of molecular weight Mw, percent conversion and optical density (OD) of the resultant polymer. Polymerization Examples 20, 21, 26, and 27 are illustrative of the effect that formic acid has on the molecular weight Mw on the polymerization of various norbornene-type polymers using a non-phosphorus containing catalyst when conversions are at 100 percent. Polymerization Example 36 is illustrative of the effect that formic acid has on the molecular weight Mw and the percent conversion on the polymerization of norbornene-type polymers using various non-phosphorus containing catalysts. Additionally, the polymers from Polymerization Examples 9 and 14 were used to develop the proposed chain transfer and activation mechanism previously described and depicted in FIG. 1.

By now it should be realized that embodiments in accordance with the present invention that advantageously provide for the control of the molecular weight and/or optical density of a poly(cyclic)olefin polymer have been described and demonstrated. Such embodiments do not encompass the previously noted deficiencies of previously known methods for the control of molecular weight and optical density and as shown in the examples above, provide excellent conversion of monomers to polymers little, if any, added complexity of process.

We claim:

1. A method of polymerizing polycyclic olefin monomers, comprising:
    combining a monomer composition comprising one or more polycyclic olefin monomers, a palladium catalyst complex, and a chain transfer/activating agent to form a mixture; and
    polymerizing the mixture to form a polymer,
    wherein said chain transfer/activating agent is formic acid.

2. The method of claim 1, where the chain transfer/activating agent provides for activating the palladium catalyst complex for forming a palladium hydride-containing moiety.

3. The method of claim 1, where the formic acid and the palladium catalyst complex interact to form a palladium formate intermediate.

4. The method of claim 3, where the formic acid serves as a chain transfer/activating agent and a catalyst activating agent.

5. The method of claim 4, where the catalyst complex comprises at least one phosphorous containing moiety.

6. A reaction mixture consisting essentially of:
one or more polycyclic olefin monomers;
a palladium catalyst complex;
an optional co-catalyst; and
a chain transfer/activating agent,
wherein said chain transfer/activating agent is formic acid.

7. The reaction mixture of claim 6, further comprising an amount of chain transfer/activating agent that is from 1 to 25 mole % of the total monomer loading to the reaction mixture.

8. The reaction mixture of claim 6, where the one or more polycyclic olefin monomers are at least two distinct types of norbornene-type monomers.

9. The reaction mixture of claim 6, where the palladium catalyst complex is essentially phosphorous-free.

10. The reaction mixture of claim 9, where at least one of the one or more polycyclic olefin monomers is according to the formula

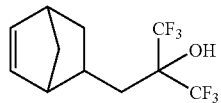

("HFANB").

11. The reaction mixture of claim 9, where at least one of the one or more polycyclic olefin monomers is according to the formula

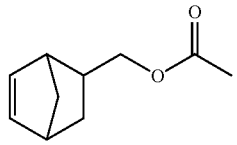

("MeOAcNB").

* * * * *